US 6,987,771 B2
United States Patent
Shimizu et al.

(10) Patent No.: US 6,987,771 B2
(45) Date of Patent: Jan. 17, 2006

(54) ROUTE OPTIMIZATION METHOD AND AGENT APPARATUS

(75) Inventors: Keiichi Shimizu, Tokyo (JP); Yusuke Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 813 days.

(21) Appl. No.: 09/865,694

(22) Filed: May 29, 2001

(65) Prior Publication Data

US 2002/0009066 A1 Jan. 24, 2002

(30) Foreign Application Priority Data

May 30, 2000 (JP) ....................................... 2000-160876

(51) Int. Cl.
*G01R 31/08* (2006.01)
*H04L 12/28* (2006.01)

(52) U.S. Cl. ...................... 370/401; 370/230; 370/392; 455/433; 455/445

(58) Field of Classification Search ................ 370/328, 370/329, 230, 236, 352, 392, 467, 401; 709/200, 709/236, 221, 241, 245; 455/433, 421, 432.1, 455/445

See application file for complete search history.

(56) References Cited

U.S. PATENT DOCUMENTS 6,578,085 B1 * 6/2003 Khalil et al. ................ 709/241
6,721,297 B2 * 4/2004 Korus et al. ................ 370/338

FOREIGN PATENT DOCUMENTS

| JP | 10-136006 | 5/1998 |
| JP | 10-145835 | 5/1998 |
| JP | 11-55328 | 2/1999 |
| JP | 11-261648 | 9/1999 |
| WO | WO 99/59363 | 11/1999 |

OTHER PUBLICATIONS

Charles Perkins, et al., Mobile IP Working Group Internet Draft, "Route Optimization in Mobile IP (Draft–IETF–Mobileip–Optim–09.TXT)", Feb. 15, 2000.

Charles Perkins, et al., Computer Networks and ISDN Systems, vol. 27, No. 3, pp. 479–491, "IMHP: A Mobile Host Protocol for the Internet", Dec. 1, 1994.

Charles Perkins, et al., Route Optimization in Mobile IP (draft–ietf–mobileip–optim–08.txt), Mobile IP Working Group Internet Draft, Feb. 25, 1999, pp. i–24.

H. Ohnishi, et al., Technical Report of IEICE, SSE99–123, vol. 99, No. 507, pp. 7–12, "Proposed Scheme for Route Optimization on the Mobile IP Network", Dec. 17, 1999 (with English Abstract).

* cited by examiner

Primary Examiner—Duc Ho
(74) Attorney, Agent, or Firm—Oblon, Spivak, McClelland, Maier & Neustadt, P.C.

(57) ABSTRACT

A foreign agent to which a correspondent terminal is attached receives a Binding Update Message from a home agent so that the foreign agent encapsulates an IP packet destined for a mobile terminal 11 before transmission thereto.

17 Claims, 21 Drawing Sheets

| HOME ADDRESS | HA ADDRESS | LIFETIME (SEC) |
|---|---|---|
| 10.76.51.100 | 10.76.51.254 | 10 |
| | | |
| | | |

| HOME ADDRESS | CARE-OF ADDRESS | HA ADDRESS | LIFETIME (SEC) |
|---|---|---|---|
| 10.76.51.100 | 10.76.53.254 | 10.76.51.254 | 10 |
| | | | |
| | | | |

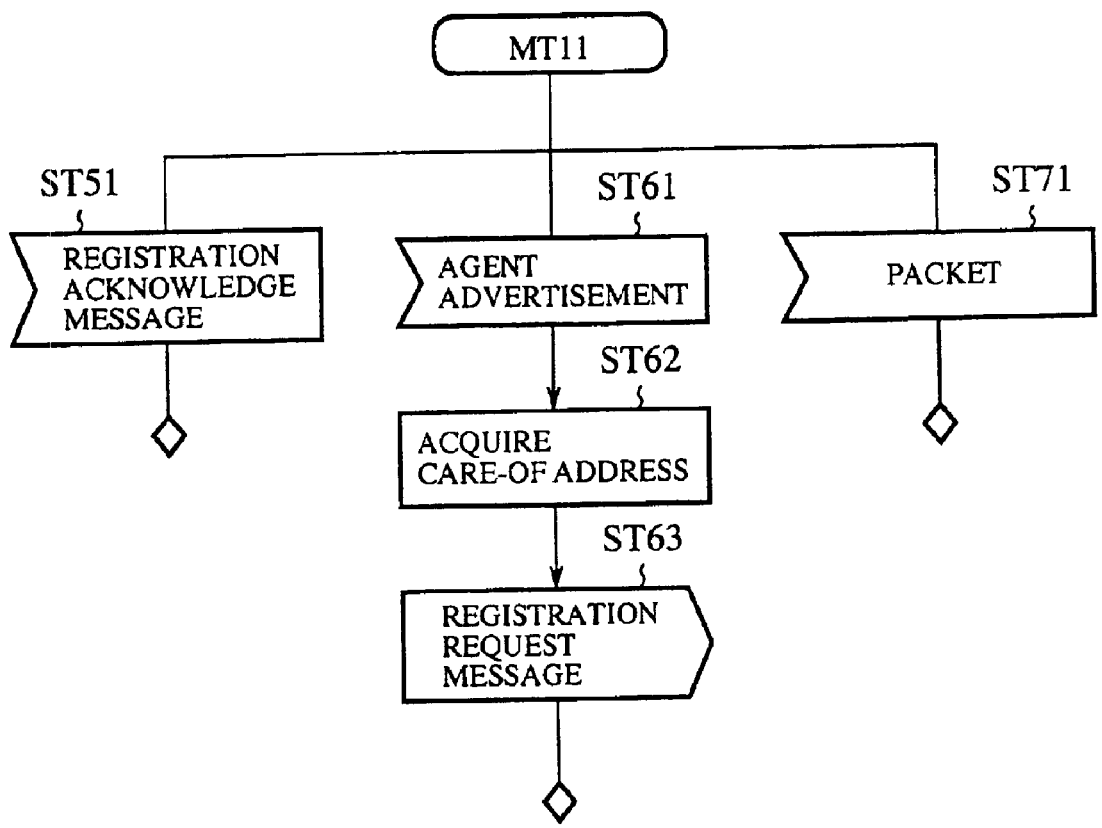

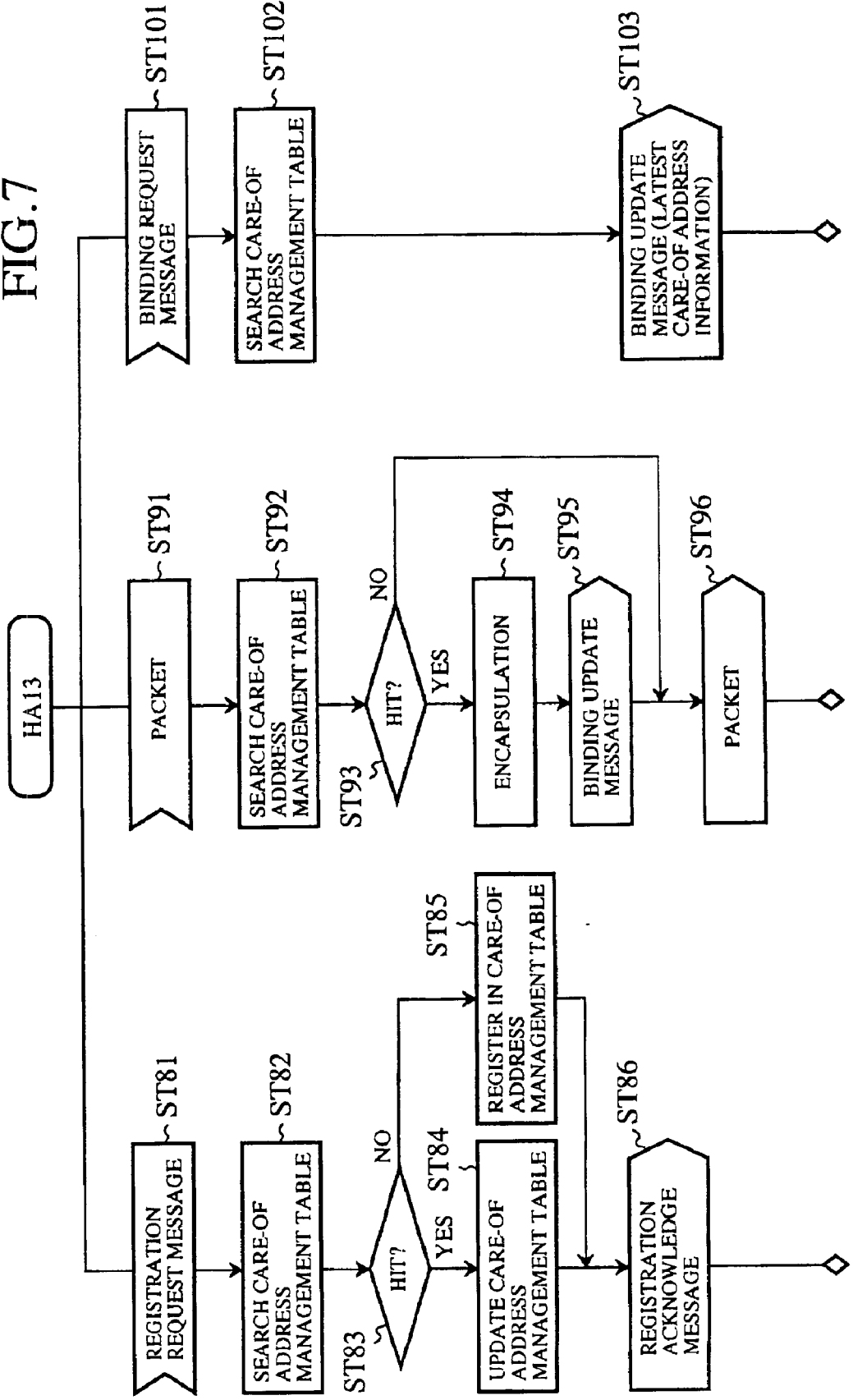

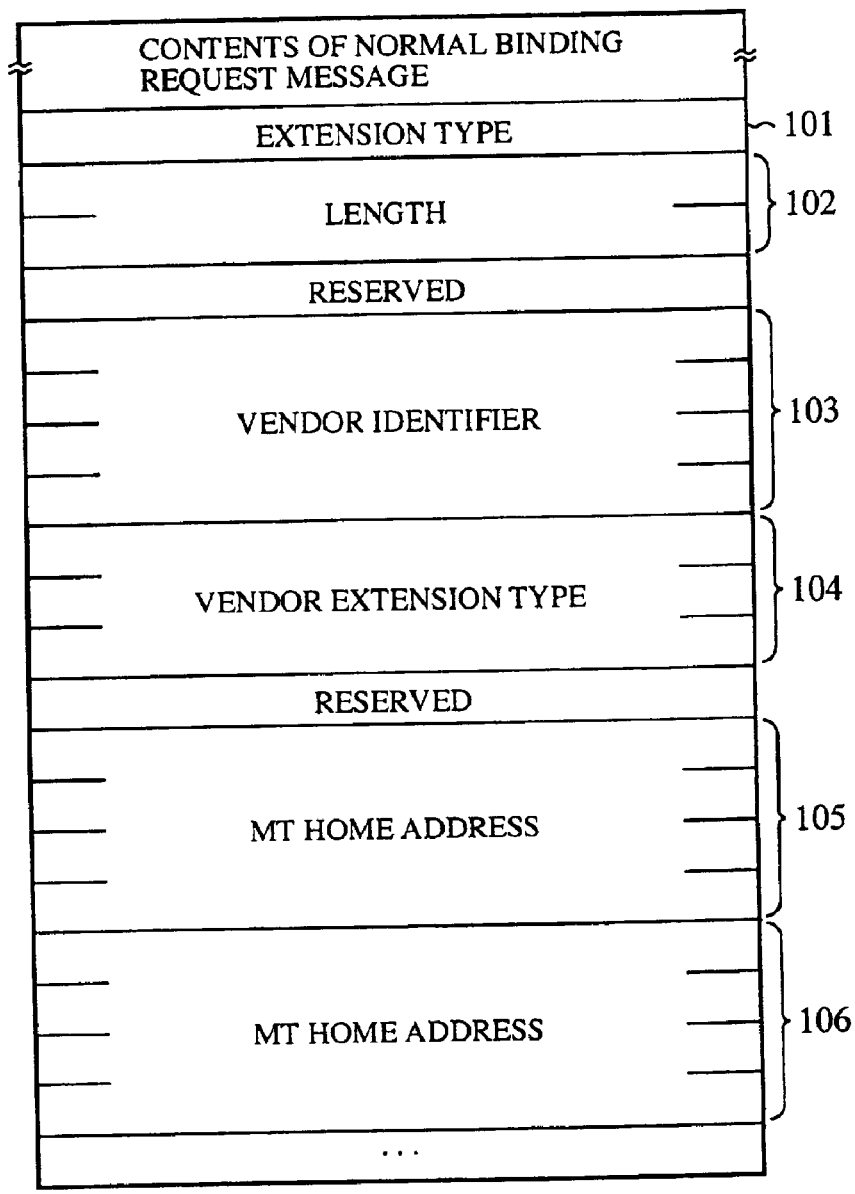

| ADDRESS OF HA USED | SUBNET MASK | SUPPORT FOR EXTENSION |
|---|---|---|
| 10.76.00.00 | 0xFFFF0000 | YES |
| 10.76.51.254 | 0xFFFFFFFF | NO |
| DEFAULT | 0xFFFFFFFF | NO |

FIG.16

| ADDRESS OF HA USED | AVAILABILITY |
|---|---|
| 10.76.51.254 | AVAILABLE |
| 10.76.55.254 | AVAILABLE |
| DEFAULT | NOT AVAILABLE |

FIG.17

| ADDRESS OF HA USED | SUBNET MASK | AVAILABILITY |
|---|---|---|
| 10.76.00.00 | 0xFFFF0000 | AVAILABLE |
| 10.76.55.254 | 0xFFFFFFFF | NOT AVAILABLE |
| DEFAULT | 0xFFFFFFFF | NOT AVAILABLE |

FIG.18

| HOME ADDRESS | ROUTE OPTIMIZATION |
|---|---|
| 10.76.55.100 | AVAILABLE |
| 10.76.55.101 | NOT AVAILABLE |
|  |  |
|  |  |
| DEFAULT | NOT AVAILABLE |

| HOME ADDRESS | SUBNET MASK | ROUTE OPTIMIZATION |
|---|---|---|
| 10.76.55.0 | 0xFFFFFF00 | AVAILABLE |
| 10.76.55.101 | 0xFFFFFFFF | NOT AVAILABLE |
| | | |
| | | |
| DEFAULT | 0xFFFFFFFF | NOT AVAILABLE |

FIG.22

| HOME ADDRESS | CARE-OF ADDRESS | LIFETIME | PRIORITY OF UPDATE | FREQUENCY OF CHANGE OF CARE-OF ADDRESS |
|---|---|---|---|---|
| 10.76.51.100 | 10.76.52.254 | 10 | 5 | 3 |
| 10.76.51.101 | 10.76.54.254 | 10 | 1 | 10 |
|  |  |  |  |  |

FIG.23

| HOME ADDRESS | INITIAL VALUE OF PRIORITY OF UPDATE |
|---|---|
| 10.76.51.100 | 5 |
| 10.76.51.101 | 3 |
|  |  |
| DEFAULT | — |

FIG.29

| 1 2 3 4 5 6 7 8 |
|---|
| CONTENTS OF NORMAL BINDING ACKNOWLEDGE MESSAGE |
| EXTENSION TYPE=134 |
| LENGTH |
| RESERVED |
| VENDOR IDENTIFIER |
| VENDOR EXTENSION TYPE |
| MT HOME ADDRESS |
| MT CARE-OF ADDRESS |
| HA ADDRESS |
| HA OPTION SUPPORT INFORMATION |

ROUTE OPTIMIZATION METHOD AND AGENT APPARATUS

BACKGROUND OF THE INVENTION

1. Field of the Invention

The present invention generally relates to a route optimization method and an agent apparatus and, more particularly, to a route optimization method and an agent apparatus by which an IP packet route is optimized in a communication system employing the Mobile IP protocol.

2. Description of the Related Art

Mobile IP, proposed by Internet Engineering Task Force (IETF), is known as a method for a mobile terminal having an IP address to maintain communication without terminating a session even when the mobile terminal moves across network domains.

FIG. 30 shows how a packet is transmitted according to the Mobile IP protocol of the related art.

Referring to FIG. 30, the mobile terminal 11 has a permanent IP address in a home domain (hereinafter, simply referred to as a home address). A home agent (HA) 13 is located in the home domain to which the mobile terminal 11 belongs. Numeral 41 indicates a correspondent terminal with which the mobile terminal 11 communicates. The correspondent terminal 41 may be a land unit or a mobile unit. An abbreviation CN/MT (correspondent node/mobile terminal) will also be used to denote the correspondent terminal 41. Numeral 201 indicates a foreign agent (FA) located in a destination domain of the mobile terminal 11 and has a care-of address.

A description will now be given of how a packet is transmitted according to Mobile IP.

After moving to a destination domain, the mobile terminal 11 acquires an address assigned to itself in the destination domain in the form of a care-of address. The mobile terminal 11 notifies the home agent 13 of the care-of address via the foreign agent 201. The home agent 13 registers the care-of address from the mobile terminal 11 in relation to the home address of the mobile terminal 11.

The correspondent terminal 41, requesting an IP packet to be sent to the mobile terminal 11, sends an IP packet destined for the home address of the mobile terminal 11. The IP packet arrives at the home agent 13 via an IP network 220. The home agent 13 encapsulates the IP packet based on information registered for the mobile terminal 11 and then forwards the encapsulated packet to the care-of address of the mobile terminal 11. The foreign agent 201 receiving the encapsulated IP packet decapsulates the packet and delivers the original IP packet to the mobile terminal 11 having the care-of address.

When the mobile terminal 11 is located in the home domain, the home agent 13 operates as a router so that the IP packet addressed to the mobile terminal 11 is routed to the mobile terminal 11.

Thus, even when the mobile terminal 11 moves across domains, the IP packet addressed to the mobile terminal 11 is ensured to arrive at the mobile terminal 11 via the home agent 13 and the foreign agent 201.

One problem with the base Mobile IP protocol is that, when the IP packet addressed to the mobile terminal 11 arrives at the mobile terminal 11 via the home agent 13, a packet may follow a path which is longer than an optimal path. When this triangular routing occurs, a relatively large transmission delay may be incurred. The transmission delay presents a serious problem when the data transmission is concerned with voice over IP datagrams, which are relatively less tolerant of delay.

An internet draft from the IETF (draft-ietf-mobileip-optim-08.txt) proposes Route Optimization to resolve the problem of transmission delay caused by triangular routing. Route Optimization uses a protocol for establishing a short-cut path from the correspondent terminal to the care-of address of the mobile terminal 11, bypassing the home agent 13. FIG. 31 shows Route Optimization applied to the related-art Mobile IP.

In the proposed Route Optimization, the correspondent terminal 41 acquires the care-of address of the mobile terminal 11 by periodically sending a Binding Request Message to the home agent 13 for the mobile terminal 11 and receives a Binding Update Message therefrom. The correspondent terminal 41 extracts the current care-of address of the mobile terminal 11 from the Binding Update Message periodically obtained. The correspondent terminal 41 encapsulates the IP packet destined for the mobile terminal 11 and transmits the encapsulated packet to the care-of address.

Thus, as shown in FIG. 31, the IP packet from the correspondent terminal 41 addressed to the mobile terminal 11 arrives at the mobile terminal 11, bypassing the home agent 13. This way, the problem with triangular routing is resolved.

One disadvantage with Route Optimization described above is that the correspondent terminal 41 must exchange messages with the home agent 13 for the mobile terminal 11 periodically, making it difficult to reduce power consumption in the correspondent terminal 41. This presents a problem especially when the correspondent terminal 41 is a battery-powered mobile unit.

In the related-art Route Optimization, the size of a header portion of the IP packet doubles due to encapsulation, thus preventing the bandwidth for transmission from the correspondent terminal 41 to the foreign agent or the home agent of the domain to which the correspondent terminal 41 belongs from being effectively used. Particularly, VoIP packets presents a serious problem since the size of a header portion is relatively large in relation to the data portion.

SUMMARY OF THE INVENTION

Accordingly, an object of the present invention is to provide a route optimization method and an agent apparatus in which the aforementioned problems are eliminated.

Another and more specific object is to provide a route optimization method and an agent apparatus in which the Binding Update Message from the home agent is received by a home agent or a foreign agent to which the correspondent terminal 41 is attached and the home agent or the foreign agent encapsulates a packet destined for the mobile terminal 11 for transmission thereto, thereby eliminating the need for periodical message exchange between the correspondent terminal 41 and the home agent 13 for the mobile terminal 11, reducing the power consumption of the correspondent terminal 41, and effectively using the transmission bandwidth by reducing the volume of data transmitted from the correspondent terminal 41 to the foreign agent of the domain to which the correspondent terminal 41 belongs.

The aforementioned objects can be achieved by a route optimization method for a communication system that allows communication between a mobile terminal and a correspondent terminal, for optimizing a route for communication between the correspondent terminal and the mobile terminal when the mobile terminal moves across network domains, comprising the steps of: causing a foreign agent or a home agent of a network domain to which the correspondent terminal currently belongs to receive a Binding Update Message from a home agent for the mobile terminal and to forward a packet destined for the mobile terminal to a care-of address of the mobile terminal specified in the Binding Update Message.

The route optimization method may further comprise the steps of: causing the foreign agent or the home agent of the network domain to which the correspondent terminal currently belongs to repeat transmission of a Binding Request Message to the home agent for the mobile terminal in order to acquire the latest care-of address; and causing the home agent for the mobile terminal to transmit, in response to the Binding Request Message, a Binding Acknowledge Message containing the latest care-of address of the mobile terminal to the foreign agent or the home agent of the network domain to which the correspondent terminal currently belongs.

The route optimization method may further comprise the steps of: causing the foreign agent or the home agent of the network domain to which the correspondent terminal belongs to combine a plurality of Binding Request Messages for obtaining the care-of addresses of a plurality of mobile terminals into an extended Binding Request Message and to send the extended Binding Request Message, when the plurality of mobile terminals are coupled to the same home agent.

The foreign agent or the home agent of the network domain to which the correspondent terminal currently belongs may use subnet masking to maintain a list of home agents capable of interpreting an extended Binding Request Message, so as to send the extended Binding Request Message for the plurality of mobile terminals to the home agent capable of interpretation and send the Binding Request Message for each mobile terminal to the other home agents.

The home agent for the mobile terminal may notify the foreign agent or the home agent of the network domain to which the correspondent terminal currently belongs whether the home agent is capable of interpreting the extended Binding Request Message, and the foreign agent or the home agent of the network domain to which the correspondent terminal currently belongs may dynamically determine whether the home agent for the mobile terminal is capable of interpreting the extended Binding Request Message, based on the notification, so that the foreign agent or the home agent sends the extended Binding Request Message for the plurality of mobile terminals to the home agent capable of interpreting the extended Binding Request Message and sends the Binding Request Message for each mobile terminal to the home agent.

The foreign agent or the home agent of the network domain to which the correspondent terminal currently belongs may accept only the Binding Update Message from the selected home agents.

The foreign agent or the home agent of the network domain to which the correspondent terminal currently belongs may use a subnet mask to maintain a list of home agents originating the acceptable Binding Update Message.

The foreign agent or the home agent may forward only the packet from the selected correspondent terminals to the mobile terminal.

The foreign agent or the home agent may use a subnet mask to designate a group of correspondent terminals with respect to route optimization.

The foreign agent or the home agent of the network domain to which the correspondent terminal currently belongs may control an interval of transmission of the Binding Request Message in accordance with a frequency of change of the care-of address.

The foreign agent or the home agent of the network domain to which the correspondent terminal currently belongs may set an initial value of priority of update for each mobile terminal, compute the priority of update in accordance with the frequency of change of the care-of address, and set the interval of transmission of the Binding Request Message in accordance with the priority of update.

The foreign agent or the home agent of the network domain to which the correspondent terminal currently belongs may maintain a plurality of care-of addresses for the mobile terminal and forward the packet destined to a home address of the mobile terminal to each of the plurality of care-of addresses.

The foreign agent or the home agent of the network domain visited by the correspondent terminal may acquire the care-of address of the mobile terminal from the foreign agent or the home agent of the network domain from which the visiting correspondent terminal arrives.

The foreign agent or the home agent of the network domain to which the correspondent terminal currently belongs may monitor a volume of packets destined for the mobile terminal or packets from the mobile terminal so as to control update of the care-of address of the mobile terminal in accordance with the monitored volume.

The foreign agent or the home agent may suspend update of the care-of address when the correspondent terminal moves out of the network domain.

The foreign agent or the home agent may resume the suspended update of the care-of address when a predetermined condition is met.

The aforementioned objects can also be achieved by an agent apparatus for a communication system in which a mobile terminal communicates with a correspondent terminal, operated as a foreign agent or a home agent for a network domain to which the correspondent terminal belongs, comprising: receiver for receiving a Binding Update Message from a home agent for the mobile terminal; and transmitter for forwarding a packet destined for the mobile terminal to a current care-of address of the mobile terminal designated in the Binding Update Message.

BRIEF DESCRIPTION OF THE DRAWINGS

Other objects and further features of the present invention will be apparent from the following detailed description when read in conjunction with the accompanying drawings, in which:

FIG. 6 is an SDL diagram showing an operation of the mobile terminal;

FIG. 7 is an SDL diagram showing an operation of a home agent;

FIG. 8 shows an example of a care-of address management table provided in the home agent for the mobile terminal;

FIG. 11 shows an example of an extended Binding Request Message according to the third embodiment;

FIG. 12 shows an example of a HA support table;

FIG. 16 shows an example of an internal table in which selected home agents are registered;

FIG. 17 shows an example of an internal table in which grouping using a subnet mask is introduced;

FIG. 18 shows an example of a service setting table;

FIG. 22 shows a binding cache table of the foreign agent according to the tenth embodiment;

FIG. 23 shows an example of a service setting table provided in the foreign agent according to an eleventh embodiment;

FIG. 29 shows an example of an extended Binding Acknowledge Message according to the thirteenth embodiment;

DETAILED DESCRIPTION OF THE PREFERRED EMBODIMENTS

First Embodiment

Figure 1:
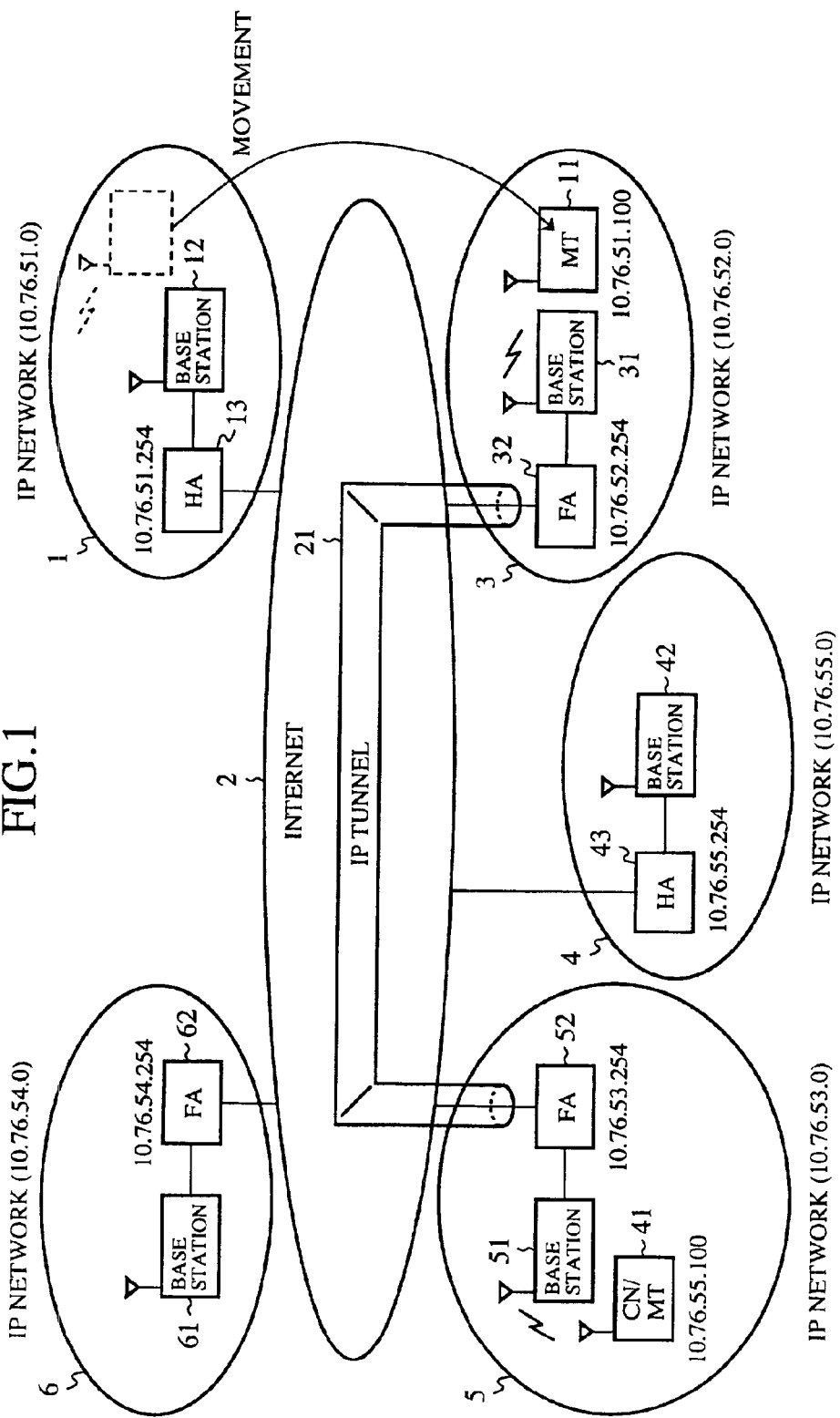
FIG. 1 shows an example of a network to which route optimization according to a first embodiment is applied.

FIG. 1 shows an example of a network to which the route optimization according to a first embodiment is applied.

Referring to FIG. 1, an IP network (network domain) 1 is a home domain for a mobile terminal 11. An IP network (network domain) 3 is a destination domain of the mobile terminal 11. An IP network (network domain) 4 is a home domain for a correspondent terminal 41. An IP network (network domain) 5 is a destination domain of the correspondent terminal 41. Numeral 6 indicates an additional IP network (network domain). The Internet 2 connects the IP networks 1, 3–6 to each other.

The mobile terminal 11 has a permanent IP address in the home domain (home address). A base station 12 is connected to the home agent 13 so as to communicate with mobile terminals located in the IP network 1. A home agent (agent apparatus) 13 is located in the home domain to which the mobile terminal 11 belongs. In the illustrated example, the network address of the IP network 1 is 10.75.51.0, the home address of the mobile terminal 11 is 10.76.51.100 and the IP address of the home agent 13 is 10.76.51.254.

A base station 31 is connected to the foreign agent 32 and communicates with the mobile terminal 11 located in the IP network 3 and with the correspondent terminal 41 over a radio channel. A foreign agent (agent apparatus) 32 is located in the IP network 3. The network address of the IP network 3 is 10.76.52.0 and the IP address of the foreign agent 32 is 10.76.52.254.

The correspondent terminal 41 communicates with the mobile terminal 11. The correspondent terminal 41 may be a land unit or a mobile unit. A base station 42 is connected to a home agent 43 and communicates with terminals located in the IP network 4 over a radio channel. The home agent (agent apparatus) 43 is located in the home domain to which the correspondent terminal 41 belongs. The network address of the IP network 4 is 10.76.55.0, the home address of the correspondence terminal 41 is 10.76.55.100 and the IP address of the home agent 43 is 10.76.55.254.

A base station 51 is connected to a foreign agent 52 and communicates with terminals located in the IP network 5. The foreign agent (agent apparatus) 52 is located in the IP network 5. The network address of the IP network 5 is 10.76.53.0 and the IP address of the foreign agent 52 is 10.76.53.254.

A base station 61 is connected to a foreign agent 62 and communicates with terminals located in the IP network 6. The foreign agent (agent apparatus) 62 is located in the IP network 6 and has a care-of address. The network address of the IP network 6 is 10.76.54.0 and the IP address of the foreign agent 62 is 10.76.54.254.

The home agent 13, the mobile terminal 11 and the correspondent terminal 41 operate as entities that comply with the Mobile IP specification.

A description will now be given of the operation of the terminals and agents.

Figure 2:
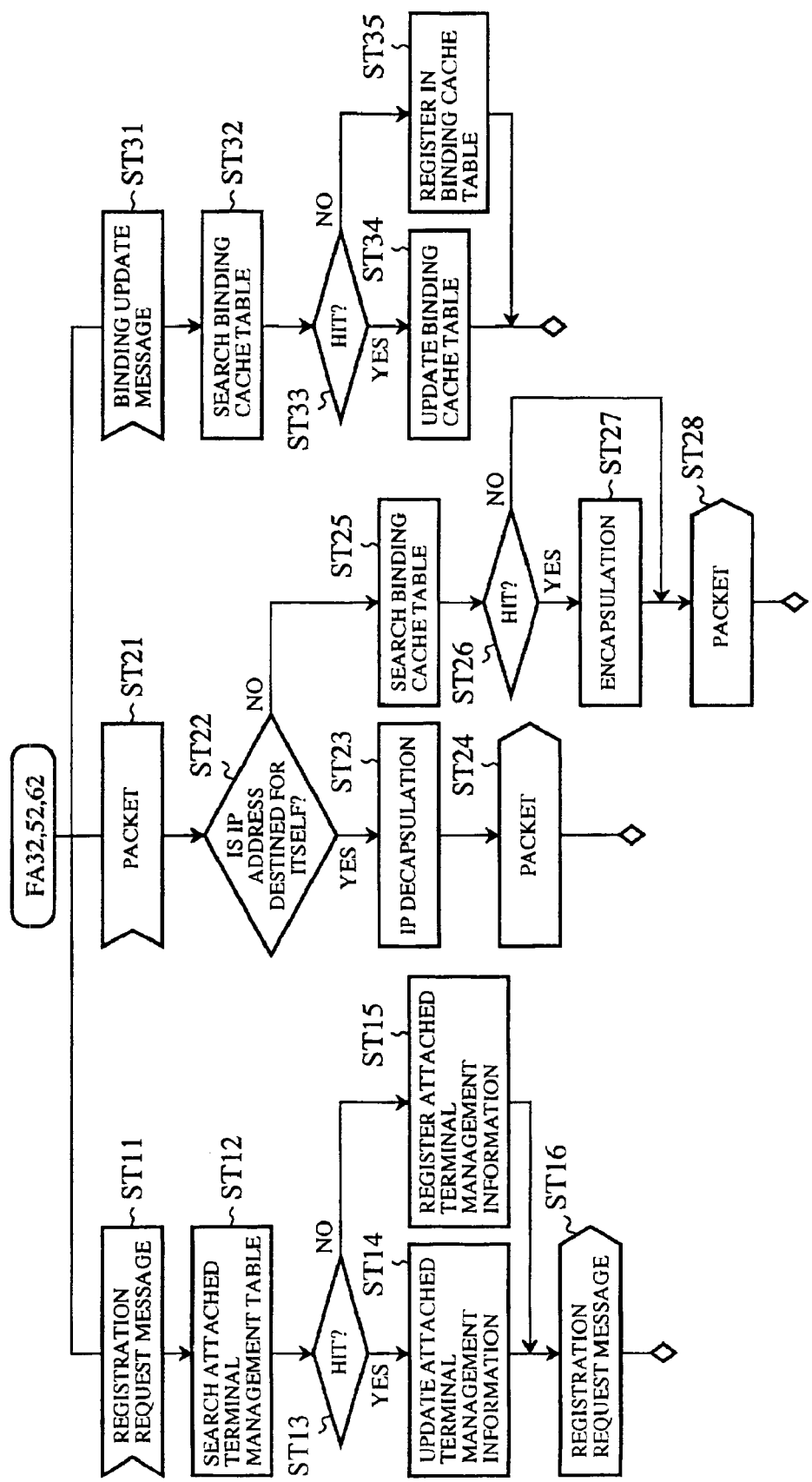
FIG. 2 is an SDL diagram showing an operation of a foreign agent.
Figures 3, 4, 5:
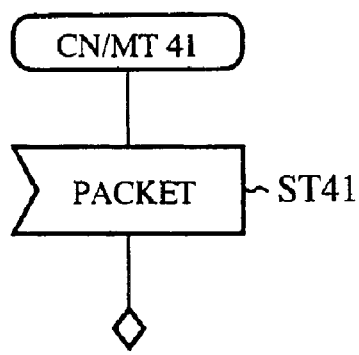
FIG. 3 shows an example of an attached terminal management table provided in the foreign agent with which a mobile terminal is connected.
FIG. 4 shows an example of a binding cache table provided in the foreign agent with which a correspondent terminal is connected.
FIG. 5 is an SDL diagram showing an operation of the correspondent terminal.

First, the operation of the foreign agents 32, 52 and 62 will be described. FIG. 2 is a specification and description language (SDL) diagram showing the operation of the foreign agents 32, 52 and 62. FIG. 3 shows an example of an attached terminal management table provided in the foreign agent (32, 52, 62) attached to the mobile terminal 11. FIG. 4 shows an example of a biding cache table provided in the foreign agent (32, 52, 62) attached to the correspondent terminal 41.

When the mobile terminal 11 moves to the IP network (3, 5, 6), the mobile terminal 11 transmits a Registration Request Message destined for the home agent 13 to the foreign agent (32, 52, 62) of the destination IP network (3, 5, 6) via the base station (31, 51, 61). The Registration Request Message includes the home address of the mobile terminal 11, the address of the home agent 13 and the care-of address acquired in the IP network (3, 5, 6).

In step ST11, the foreign agent (32, 52, 62) receives the Registration Request Message from the mobile terminal 11 located in the home IP network (3, 5, 6) via the base station (31, 51, 61). In step ST12, the foreign agent (32, 52, 62) searches the attached terminal management table as shown in FIG. 3. In step ST13, the foreign agent (32, 52, 62) makes a determination as to whether the mobile terminal 11 is registered in the attached terminal management table. If it is determined that the mobile terminal 11 is registered in the attached terminal management table, registered information is updated bases on the Registration Request Message in step ST14. If it is determined that the mobile terminal 11 is not registered in the attached terminal management table, the foreign agent (32, 52, 62) registers the mobile terminal 11 in the attached terminal management table in step ST15 based on the Registration Request Message.

In step ST16, the foreign agent (32, 52, 62) forwards the Registration Request Message to the home agent 13 for the mobile terminal 11.

In step ST21, the foreign agent (32, 52, 62) receiving an IP packet from a terminal in the Internet 2 or the home IP network (3, 5, 6) examines the header portion of the IP packet so as to determine whether the IP packet is destined for an IP address in the home IP network (3, 5, 6). If is determined that the IP packet is destined for an IP address in the home IP network (3, 5, 6), the foreign agent (32, 52, 62) decapsulates the IP packet in step ST23 and delivers the original IP packet to a corresponding terminal in the home IP network (3, 5, 6) in step ST24.

When it is determined that the IP packet is not destined for an IP address in the home IP network (3, 5, 6), the foreign agent (32, 52, 62) searches the binding cache table as shown in FIG. 4 (described later) in step ST25. In step ST26, the foreign agent (32, 52, 62) determines whether the mobile terminal 11, to which the IP packet is addressed, is registered in the binding cache table. If it is determined that the mobile terminal 11 is registered in the binding cache table, the foreign agent (32, 52, 62) reads the care-of address for the mobile terminal 11 from the binding cache table in step ST27. The foreign agent (32, 52, 62) then encapsulates the IP packet and forwards, in step ST28, the encapsulated IP packet to the care-of address of the mobile terminal 11 to which the original IP packet is addressed. If it is determined that the mobile terminal 11 is not registered in the binding cache table, the foreign agent (32, 52, 62) forwards the IP packet in step ST28 without encapsulation.

In step ST31, the foreign agent (32, 52, 62) receives a Binding Update Message from the home agent 13 for the mobile terminal 11. In step ST 32, the foreign agent (32, 52, 62) searches the binding cache table as shown in FIG. 4. In step ST33, the foreign agent (32, 52, 62) determines whether the mobile terminal 11, specified in the Binding Update Message, is registered in the binding cache table. If it is determined that the mobile terminal 11, specified in the Binding Update Message, is registered in the binding cache table, the foreign agent (32, 52, 62) updates registered information in step ST34 based on the Binding Update Message. If it is determined that the mobile terminal, specified in the Binding Update Message, is not registered in the binding cache table, the foreign agent (32, 52, 62) registers the mobile terminal 11 in the binding cache table in step ST35 based on the Binding Update Message. The Binding Update Message includes the home address of the mobile terminal 11, the care-of address thereof, the address of the home agent and a timeout value of the Message. The binding cache table also includes similar information registered therein.

A description will now be given of the operation of the correspondent terminal 41. FIG. 5 is an SDL diagram showing the operation of the correspondent terminal 41. In step ST41, the correspondent terminal 41 receives the IP packet via the foreign agent (32, 52, 62) or the home agent 43. The foreign agent (32, 52, 62) or the home agent 43 is responsible for encapsulation and decapsulation so that the correspondent terminal 41 according to the first embodiment does not have to handle encapsulation and decapsulation.

A description will now be given of the operation of the mobile terminal 11. FIG. 6 is an SDL diagram showing the operation of the mobile terminal 11. In step ST51, the mobile terminal 11 receives a Registration Acknowledge Message from the home agent 13 in response to a Registration Request Message. In step ST61, the mobile terminal 11 receives an agent advertisement from the foreign agent (32, 52, 62) of the IP network (3, 5, 6) in which the mobile terminal 11 is located. In step ST62, the mobile terminal 11 acquires a care-of address corresponding to the agent advertisement. In step ST63, the mobile terminal 11 generates a Registration Request Message that includes the care-of address of the mobile terminal 11 and transmits the Registration Request Message to the home agent 13 via the foreign agent (32, 52, 62). In step ST71, the mobile terminal 11 receives the IP packet via the foreign agent (32, 52, 62) or the home agent 13.

FIG. 7 is an SDL diagram showing the operation of the home agent 13. FIG. 8 shows an example of a care-of address management table for the mobile terminal 11 provided in the home agent 13.

Upon receipt of the Registration Request Message from the mobile terminal 11 in step ST81, the home agent 13 for the mobile terminal 11 searches the care-of address management table as shown in FIG. 8 in step ST82. In step ST83, the home agent 13 determines whether the mobile terminal 11 is registered in the care-of address management table. If it is determined that the mobile terminal 11 is registered in the care-of address management table, the home agent 13 updates information registered in the table based on the Registration Request Message in step ST84. If it is determined that the mobile terminal 11 is not registered in the care-of address management table, the home agent 13 registers the mobile terminal 11 in the care-of address management table based on the Registration Request Message in step ST85.

In step ST86, the home agent 13 transmits a Registration Acknowledge Message to the mobile terminal 11 indicating that registration is complete.

Upon receipt of an IP packet from a terminal in the Internet 2 or the home IP network (3, 5, 6) in step ST91, the home agent 13 searches the care-of address management table in step ST92. In step ST93, the home agent 13 determines whether the mobile terminal 11, to which the IP packet is addressed, is registered in the care-of address table.

If it is determined that the mobile terminal 11, to which the IP packet is addressed, is registered in the care-of address management table, the home agent 13 reads the care-of address of the mobile terminal 11 from the care-of address in step ST94 so as to encapsulate the IP packet. In step ST95, the home agent 13 transmits a Binding Update Message for the mobile terminal 11, to which the IP packet is addressed, to a sender of that IP packet. In step ST96, the home agent 13 forwards the encapsulated IP packet to the mobile terminal 11. If it is determined in step ST93 that the mobile terminal 11 is not registered in the care-of address management table, the home agent 13 determines that the mobile terminal 11 is located in the home domain. In step ST96, the home agent 13 delivers the IP packet to the mobile terminal 11 via the base station 12.

When receiving in step ST101 a Binding Request Message for the mobile terminal 11 from the foreign agent (32, 52, 62) of the domain to which the correspondent terminal 41 currently belongs, the home agent 13 searches the care-of address management table as shown in FIG. 8 in step ST102. In step ST103, the home agent 13 transmits a Binding Update Message for mobile terminal 11 to the contacting foreign agent (32, 52, 62).

The home agent 43 may also be configured to perform a similar operation with respect to the correspondent terminal 41.

Figure 9:
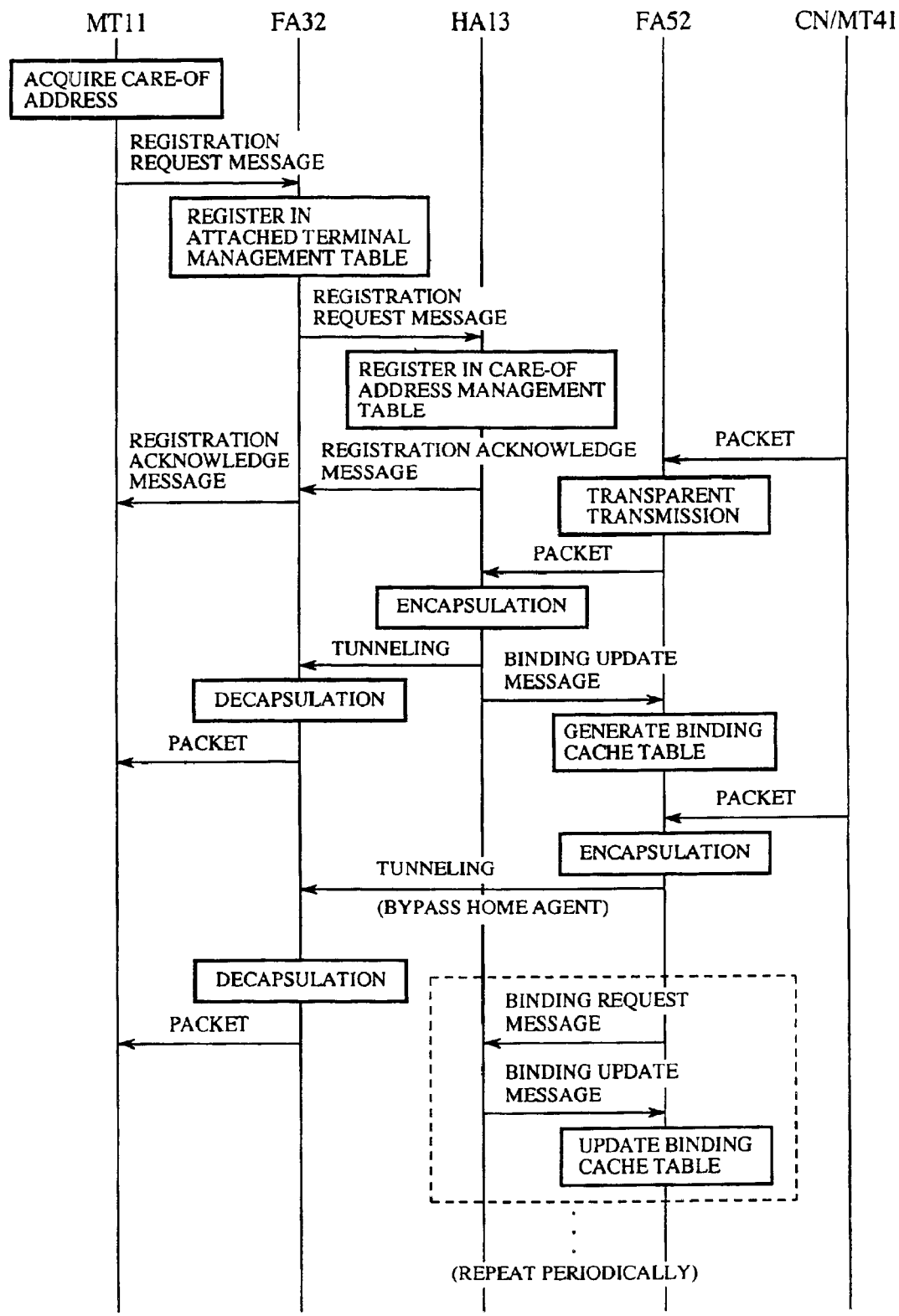
FIG. 9 shows a sequence of care-of address registration and packet transmission.

A description will now be given of how a care-of address of the mobile terminal 11 is registered in the home agent 13 when the mobile terminal 11 moves from the IP network 1 to the IP network 3, and how the correspondent terminal 41 sends a packet to the mobile terminal 11. FIG. 9 shows a sequence of registration of the care-of address of the mobile terminal 11 and packet transmission. The base stations 12, 31, 42, 51 and 61 only perform transparent transmission so that the operation thereof is omitted. Since the correspondent terminal 41 remains stationary, it may be considered as a land unit.

A description will now be given of how the care-of address of the mobile terminal 11 is registered in the home agent 13 when the mobile terminal 11 has moved from the IP network 1 to the IP network 3.

When the mobile terminal 11 has moved from the IP network 1 to the IP network 3, the mobile terminal 11 acquires the care-of address through the Dynamic Host Configuration Protocol (DHCP). The mobile terminal 11 registers the care-of address in the foreign agent 32 and the home agent 13 by transmitting a Registration Request Message to the foreign agent. 32. The Registration Request Message includes the care-of address of the mobile terminal 11, the home address of the mobile terminal 11, the address of the home agent 13 for the mobile terminal 11.

The foreign agent 32 receiving the Registration Request Message determines that the mobile terminal 11 is visiting the home IP network 3. The foreign agent updates the attached terminal management table so that the home address 10.76.51.100 of the mobile terminal 11 is mapped into the address 10.76.51.254 of the home agent 13.

Further, the foreign agent 32 forwards the Registration Request Message to the home agent 13 so that the new care-of address of the mobile terminal 11 is registered in the home agent 13 for the mobile terminal 11.

Upon receipt of the Registration Request Message, the home agent 13 updates the care-of address management table shown in FIG. 8 so that the care-of address 10.76.52.254 included in the Registration Request Message is mapped into the home address 10.76.51.100 of the mobile terminal 11.

Before moving to the IP network 3, the mobile terminal 11 was accommodated in the home IP network 1 so that the mobile terminal 11 did not have a care-of address. Correspondence between the home address of the mobile terminal 11 and the care-of address was not registered in the care-of address management table. Thus, when the mobile terminal 11 moves to the IP network 3, the care-of address 10.76.52.254 is delivered to the home agent 13 for the first time. The home agent 13 registers the care-of address of the mobile terminal 11 in the care-of address management table shown in FIG. 8 for the first time. The home agent 13 transmits a Registration Acknowledge Message to the sender of the Registration Request Message to indicate that the care-of address is registered for the first time in the care-of address management table or the care-of address management table is updated.

The foreign agent 32 receiving the Registration Acknowledge Message forwards it to the mobile terminal 11 in order to inform the mobile terminal 11 that registration is complete.

When the registration of the mobile terminal 11 in the home agent 13 is complete, the information relating to the mobile terminal 11 is registered as shown in FIG. 3 in the attached terminal management table of the foreign agent 32. The information relating to the mobile terminal 11 is also registered as shown in FIG. 8 in the care-of address management table of the home agent 13. The process of registration described above is in accordance with the specification of the Mobile IP protocol.

A description will now be given of the routing between the correspondent terminal 41 and the mobile terminal 11.

The correspondent terminal 41 transmits an IP packet to the mobile terminal 11 without encapsulation. The IP packet is received by the foreign agent 52 of the IP network 5 to which the correspondent terminal 41 currently belongs. If the address of the IP packet (home address 10.76.51.100 of the mobile terminal 11) is not identified in the binding cache table shown in FIG. 4, the foreign agent 52 transmits the IP packet transparently to the destination.

The home agent 13 receiving the IP packet encapsulates the IP packet based on the information registered for the mobile terminal 11 in the care-of address management table generated in the registration process. The home agent 13 then tunnels the encapsulated packet to the care-of address 10.76.52.254.

The IP packet tunneled by the home agent 13 arrives at the foreign agent 32. The packet is decapsulated by the foreign agent 32 so that the original IP packet arrives at the mobile terminal 11.

The packet follows a path according to the triangular routing since the binding cache table of the foreign agent 52 does not include information registered for the mobile terminal 11.

When tunneling the IP packet, the home agent 13 sends a Binding Update Message to the correspondent terminal 41. The foreign agent 52 receives the Binding Update Message so as to register the information relating to the mobile terminal 11 in the binding cache table as shown in FIG. 4. Since the corresponding terminal 41 is not supplied with the Binding Update Message, it continues to send packets to the home address 10.76.51.100 of the mobile terminal 11 without encapsulation.

After the information relating to the mobile terminal 11 is registered in the binding cache table of the foreign agent 52, the foreign agent 52 encapsulates IP packets from the correspondent terminal 41 based on the information registered in the binding cache table for the mobile terminal 11. The foreign agent 52 tunnels the encapsulated packet to the care-of address 10.76.52.254 of the mobile terminal 11. More specifically, the foreign agent 52 reads the destination IP address 10.76.51.100 from the header portion of the IP packet from the correspondent terminal 41 and searches for the registered information bound to the home address identical to the destination IP address. The foreign agent 52 determines that the care-of address 10.76.52.254 bound to the registered information is the care-of address of the mobile terminal 11.

Thus, the encapsulated IP packet arrives at the foreign agent 32, bypassing the home agent 13. In this way, the disadvantage with triangular routing is resolved.

As described, according to the first embodiment, the Binding Update Message from the home agent 13 is received by the foreign agent (32, 52, 62) to which the correspondent terminal 41 is attached so that the foreign agent (32, 52, 62) encapsulates the IP packet addressed to the mobile terminal 11 before transmission. Accordingly, the need for periodical communication between the correspondent terminal 41 and the home agent 13 for the mobile terminal 11 is eliminated, thus reducing the power consumption of the correspondent terminal 41. Moreover, the transmission bandwidth is efficiently used by reducing the volume of data transmitted from the correspondent terminal 41 to the foreign agent 52 of the domain to which the correspondent terminal 41 belongs.

Second Embodiment

The foreign agent (32, 52, 62) according to a second embodiment transmits a Binding Request Message to the home agent 13 before the expiration of lifetime specified in the Binding Update Message, in order to prompt the home agent 13 for transmission of a Binding Update Message. The Binding Request Message complies with the Internet draft (draft-ietf-mobileip-optim-08.txt). In this case, the Binding Request Message includes the home address of the mobile terminal 11.

The home agent 13 receiving the Binding Request Message returns the Binding Update Message including the latest care-of address corresponding to the home address of the mobile terminal 11 to the sender of the Binding Request Message. The foreign agent (32, 52, 62) receiving the Binding Update Message updates the care-of address of the mobile terminal 11 in the binding cache table based on the Binding Update Message.

The other aspects of the second embodiment are the same as the corresponding aspects according to the first embodiment so that the description thereof is omitted.

As described, according to the second embodiment, it is ensured that the foreign agent (32, 52, 62) of the domain to which the correspondent terminal 41 belongs periodically sends a message to the home agent 13 in order to acquire the latest care-of address of the mobile terminal 11. Thereby, route optimization is achieved without the periodical communication between the correspondent terminal 41 and the home agent 13. With this, packets are tunneled to the latest care-of address. Moreover, the volume of data transmitted from the correspondent terminal 41 to the foreign agent (32, 52, 62) of the domain to which the correspondent terminal 41 belongs is reduced.

Third Embodiment

Figure 10:
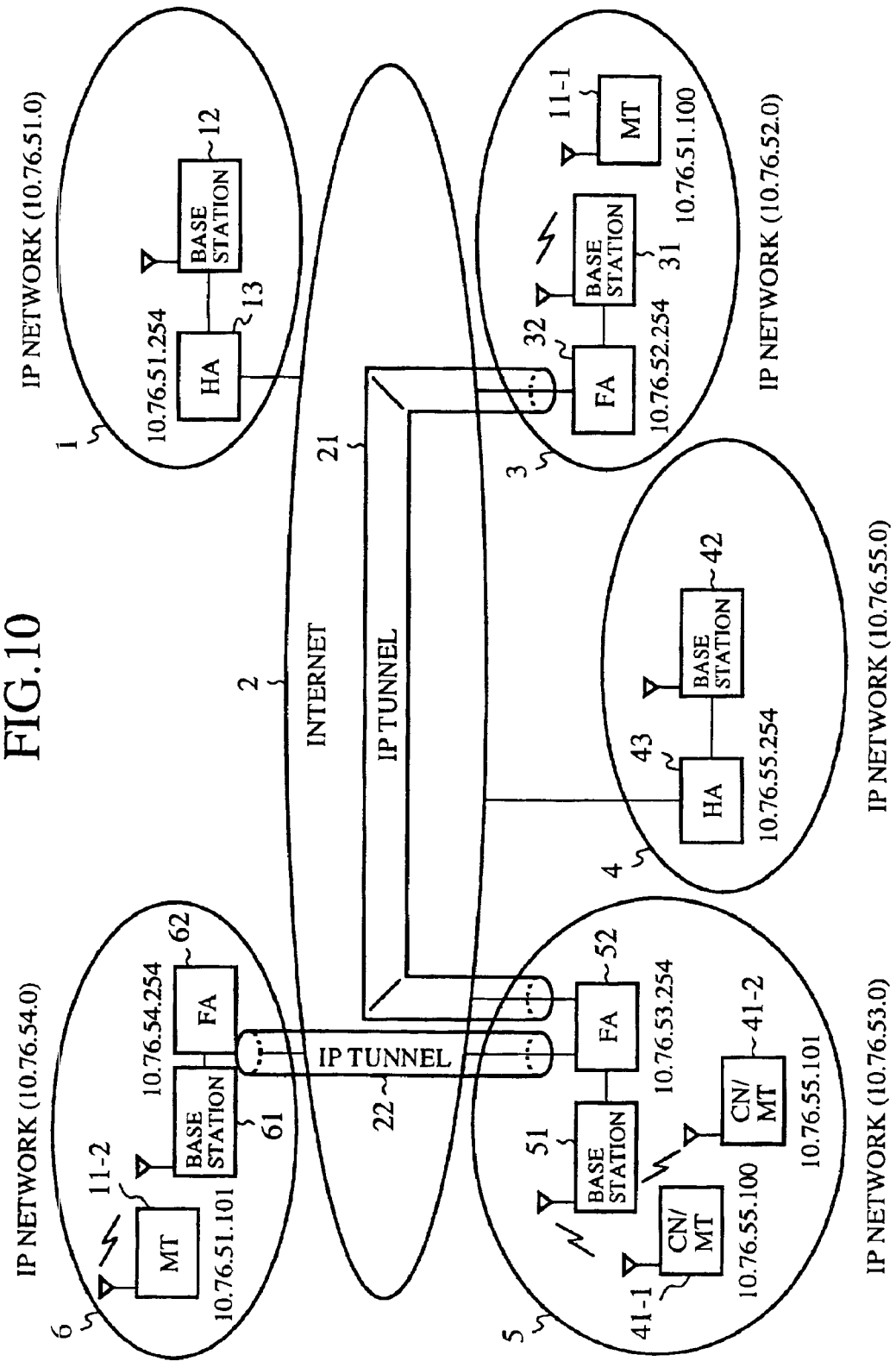
FIG. 10 shows an example of a network to which the route optimization according to a third embodiment is applied.

FIG. 10 shows an example of a network to which the route optimization method according to a third embodiment is applied. Referring to FIG. 10, the IP network 1 is the home domain for mobile terminals 11-1 and 11-2. The mobile terminals 11-1 and 11-2 communicate with correspondent terminals 41-1 and 41-2, respectively. The IP network 4 is the home domain for the correspondent terminals 41-1 and 41-2. The home address of the correspondent terminal 41-1 is 10.76.55.100 and the home address of the mobile terminal 11-1 which communicates with the correspondent terminal 41-1 is 10.76.51.100. The home address of the correspondent terminal 41-2 is 10.76.55.101 and the home address of the mobile terminal 11-2 which communicates with the correspondent terminal 41-2 is 10.76.51.101.

As indicated in FIG. 10, the foreign agent 52 (32, 62) according to the third embodiment combines a plurality of Binding Request Messages, requesting the current mobility binding of the mobile terminals 11-1 and 11-2, into an extended Binding Request Message, when the corresponding terminals 41-1, 41-2 located in the home IP network 5 (3, 6) respectively communicate with the mobile terminals 11-1 and 11-2 that belong to the same home domain. The foreign agent 52 (32, 62) transmits the extended Binding Request Message to the home agent 13.

The foreign agent 52 (32, 62) according to the third embodiment is provided with a HA support table in which home agents capable of interpreting an extended Binding Request Message are listed. The foreign agent 52 (32, 62) refers to the HA support table so as to send the extended Binding Request Message to a home agent only when the home agent is capable of interpreting an extended Binding Request Message. Otherwise, the foreign agent 52, (32, 62) sends a normal (unextended) Binding Request Message.

FIG. 11 shows an example of an extended Binding Request Message according to the third embodiment. As shown in FIG. 11, in addition to the information included in the normal Binding Request Message, the extended Binding Request Message includes an extension type 101, which is permanently set to "38", a length of the extension 102, a vendor identifier 103, which is a vendor-specific identifier, a vendor extension type 104, which is a vendor-specific extension type, and home addresses 105 and 106 of the mobile terminals for which the Binding Update Message is requested.

The message extension described above is in conformity with the critical vendor extension format of the IETF Internet draft (draft-ietf-vender-ext-05. txt). According to this draft, when the foreign agent not capable of interpreting the extension receives the message extended in accordance with the critical vendor extension format, the whole message is ignored. Accordingly, when the home agent receives the extended Binding Request Message, the home agent does nothing to the message.

FIG. 12 shows an example of a HA support table. As shown in FIG. 12, the table defines the mapping between the IP address of the home agent 13 for the mobile terminal and information indicating whether the home agent is capable of interpreting the extended Binding Request Message.

A description will now be given of the operation according to the third embodiment.

When the correspondent terminals 41-1 and 41-2 located in the home IP network 5 (3, 6) respectively communicate with the mobile terminals 11-1 and 11-2 having the same home domain, the foreign agent 52 (32, 62) according to the third embodiment sends the extended Binding Request Message to the home agent 13 capable of interpreting the extended Binding Request Message by referring to the HA support table. The foreign agent 52 (32, 62) sends the normal (unextended) Binding Request Message to the home agent 13 not having the interpreting capability.

Figure 13:
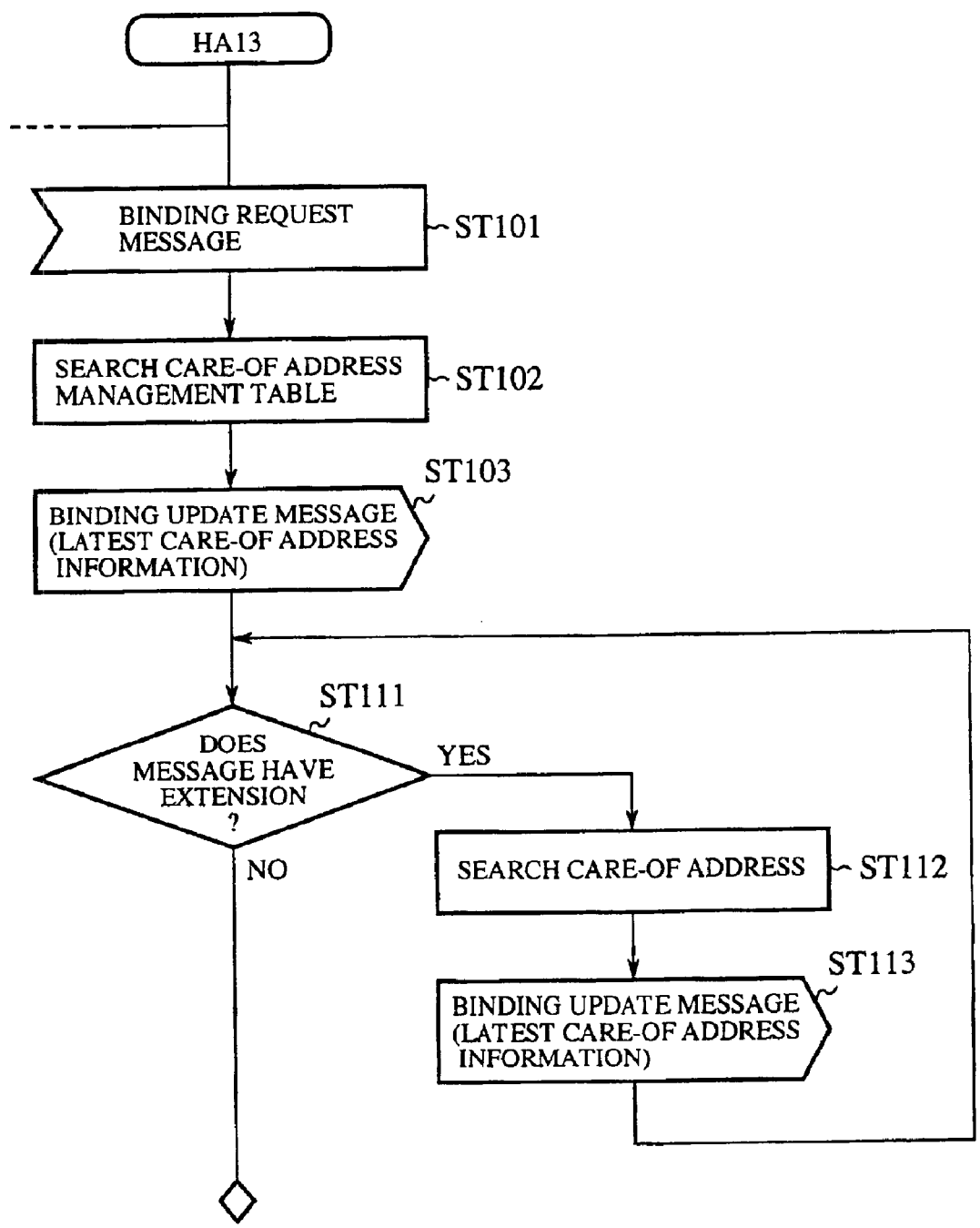
FIG. 13 is an SDL diagram showing an operation performed when the home agent capable of interpreting the extended Binding Request Message receives the Binding Request Message.

A description will now be given of the operation of the home agent 13 capable of interpreting the extended Binding Request Message. FIG. 13 is an SDL diagram showing the operation of the home agent capable of interpreting the extended Binding Request Message when it received the extended Binding Request Message.

In steps ST101–ST103, the home agent 13 according to the third embodiment reads, from the care-of address management table, the latest care-of address corresponding to the home address of the mobile terminal included in unextended portion of the received Binding Request Message. The home agent 13 then sends a Binding Update Message that includes the latest care-of address to the foreign agent 52 (32, 62) originating the Binding Request Message.

Subsequently, in step ST111, the home agent 13 determines whether the received Binding Request Message includes an extended portion. If it is determined that the Message does not contain an extended portion, the process is terminated. If it is determined that the Message contains an extended portion, control is turned to step ST12 where the home agent 13 reads, from the care-of address management table, the latest care-of addresses corresponding to the home addresses of the mobile terminals listed in the extended portion. In step ST113, the home agent 13 transmits the Binding Update Message that includes the latest care-of addresses to the sender of the Binding Request Message. The home agent 13 repeats the steps ST111–ST113 until the home addresses of the mobile terminals listed in the extended portion are exhausted.

The other aspects of the operation are the same as corresponding aspects according to the first embodiment so that the description thereof is omitted.

As described, according to the third embodiment, when the correspondent terminals 41-1 and 41-2 respectively communicate with the mobile terminals 11-1 and 11-2 having the same home domain, the foreign agent 52 (32, 62) combines Binding Request Messages, requesting the current mobility binding of the mobile terminals 11-1 and 11-2, into an extended Binding Request Message. The foreign agent 52 (32, 62) then sends the extended Binding Request Message. In this way, the volume of data transmitted from the foreign agent 52 (32, 62) to the home agent 13 is reduced. As a result, the switching load imposed on the routers and the network load are reduced.

Fourth Embodiment

The foreign gent (32, 52, 62) according to a fourth embodiment introduces a subnet mask in the HA support table so that the capability or the absence thereof of interpreting the extended Binding Request Message is specified for a set of home agents 13 included in the subnet.

Figures 14, 15:
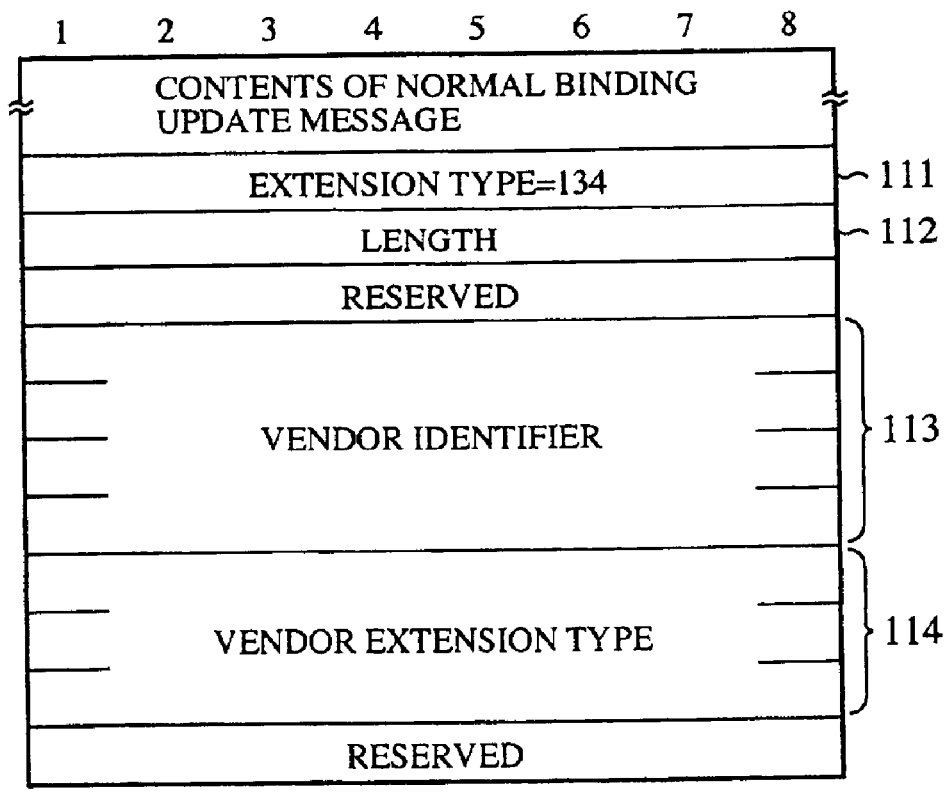
FIG. 14 shows an example of a HA support table in which a subnet mask is introduced.
FIG. 15 shows an example of a Binding Update Message used when the HA support table is dynamically set.

FIG. 14 shows an example of a HA support table in which a subnet is introduced. In the HA support table shown in FIG. 14, the home agents 13 on the IP network belonging to the IP network having the net address 10.76.0.0 are indicated as being capable of interpreting the extended Binding Request Message with the exception of the agent having the IP address 10.76.51.254.

The other aspects of the operation are the same as the corresponding aspects according to the third embodiment so that the description thereof is omitted.

As described, according to the fourth embodiment, a group of home agents 13 in a given subnet are indicated as being or not being capable of interpreting an extended Binding Request Message. Accordingly, the HA support table is generated efficiently.

Fifth Embodiment

The foreign agent (32, 52, 62) according to a fourth embodiment dynamically configures a HA support table according to the third embodiment, in accordance with a notification from the home agent 13.

The home agent 13 for the mobile terminal 11 notifies the foreign agent (32, 52, 62) of the IP network (3, 5, 6) to which the correspondent terminal 41 belongs that the home agent 13 is capable of interpreting an extended Binding Request Message. The home agent 13 appends an extension, indicating that it has the capability, to a Binding Update Message transmitted at an opportunity other than the opportunity to respond to a Binding Request Message.

FIG. 15 shows an example of a Binding Update Message for dynamically setting the HA support table. As shown in FIG. 15, in addition to the information included in a normal Binding Update Message, the Binding Update Message according to the fifth embodiment includes an extension type 111, which is permanently set to "134", a length of the extension 112, a vendor identifier 113, which is a vendor-specific identifier, and a vendor extension type 114, which is a vendor-specific extension type.

Upon receipt of the extended Binding Update Message, the foreign agent (32, 52, 62) rewrites the information registered in the HA support table for the home agent 13 originating the Binding Update Message.

The message extension described above is in conformity with the normal vendor extension format of the IETF Internet draft (draft-ietf-vender-ext-05.txt). According to the draft, when the foreign agent not capable of interpreting the extension receives a message extended in accordance with the normal vendor extension format, the foreign agent should is requested to process the Message by ignoring the extension. In other words, when the foreign agent not capable of interpreting the extension receives a Binding Update Message having an extension, only the extension is ignored so that the remaining portions are normally processed.

The other aspects of the fifth embodiment are the same as the corresponding aspects according to the first embodiment so that the description thereof is omitted.

As described, according to the fifth embodiment, the foreign agent (32, 52, 62) is allowed to dynamically set a HA support table in accordance with a notification from the home agent 13. Accordingly, a network manager need not manually set the HA support table of the foreign agent (32, 52, 62). Indication as to whether the home agent 13 is capable of interpreting an extended Binding Request Message is automatically set in the HA support table. An advantage of the fifth embodiment is that the setting of the HA support table is simplified.

Sixth Embodiment

The foreign agent (32, 52, 62) according to a sixth embodiment accepts a Binding Update Message from the selected home agent 13.

Route Optimization fails when a care-of address is changed by a Binding Update Message with a malicious intent. When this failure occurs, a packet arrives at an undesired destination instead of arriving at a proper destination. It is thus preferable, from the standpoint of security, that only those Binding Update Messages from a trusted home agent 13 be used. Accordingly, the foreign agent (32, 52, 62) according to the sixth embodiment accepts only those Binding Update Messages from the selected home agents 13.

The foreign agent (32, 52, 62) according to the sixth embodiment is provided with an internal table in which the selected home agents 13 are registered. The foreign agent (32, 52, 62) updates the care-of address of the mobile terminal 11 only in accordance with the Binding Update Messages from the home agents 13 positively registered in the internal table. Binding Update Messages from the other home agents 13 are ignored.

FIG. 16 is an example of an internal table in which the selected home agents 13 are specified. As shown in FIG. 16, each of the IP addresses of the home agents 13 listed is mapped into information indicating whether the Binding Update Message from the corresponding home agent is acceptable. In the case of the internal table of FIG. 16, the Binding Update Message from the home agent 13 having the IP address 10.76.51.254 is accepted. The Binding Update Message from the other home agents 13 is not accepted.

The other aspects of the operation according to the sixth embodiment are the same as the corresponding aspects according to the third embodiment so that the description thereof is omitted.

As described, according to the sixth embodiment, only those Binding Update Message from the selected home agents 13 are accepted. Thus, it is ensured that only those Binding Update Messages from the trusted home agents 13 are used, resulting in reinforcement of the security.

Seventh Embodiment

In a seventh embodiment, the home agents 13 registered in the internal table provided in the foreign agent (32, 52, 62) according to the sixth embodiment are arranged into groups, using a subnet mask.

FIG. 17 shows an example of an internal table in which grouping using a subnet mask is introduced. In the case of the internal table shown in FIG. 17, only those Binding Update Messages from the home agents 13 belonging to the subnet having the IP address 10.76.0.0 are accepted with an exception of the home agent 13 having the IP address 10.76.55.254.

Thus, according to the seventh embodiment, the home agents 13 whose Binding Update Message is accepted are listed using subnet grouping. With this, identification the selected home agents 13 assigned the authority to issue an acceptable Binding Update Message is easily implemented.

Eighth Embodiment

The foreign agent (32 52, 62) according to an eighth embodiment encapsulates only those IP packets from selected correspondent terminals (41-1, 41-2) and tunnels the encapsulated packets.

The foreign agent (32, 52, 62) according to the eighth embodiment is provided with a service setting table in which information indicating whether Route Optimization is executed for the correspondent terminal 41-$i$ (i=1, 2) located in the home IP network (3, 5, 6).

FIG. 18 shows an example of a service setting table. When the service setting table shown in FIG. 18 is provided in the network shown in FIG. 10, the foreign agent 52 (32, 42) encapsulates IP packets form the correspondent terminal 41-1 having the home address 10.76.55.100 and tunnels the encapsulated packets. In contrast, the foreign agent 52 forwards IP packets from the correspondent terminal 41-2 having the home address 10.75.55.101 transparently.

A description will now be given of the operation according to the eighth embodiment.

Figure 19:
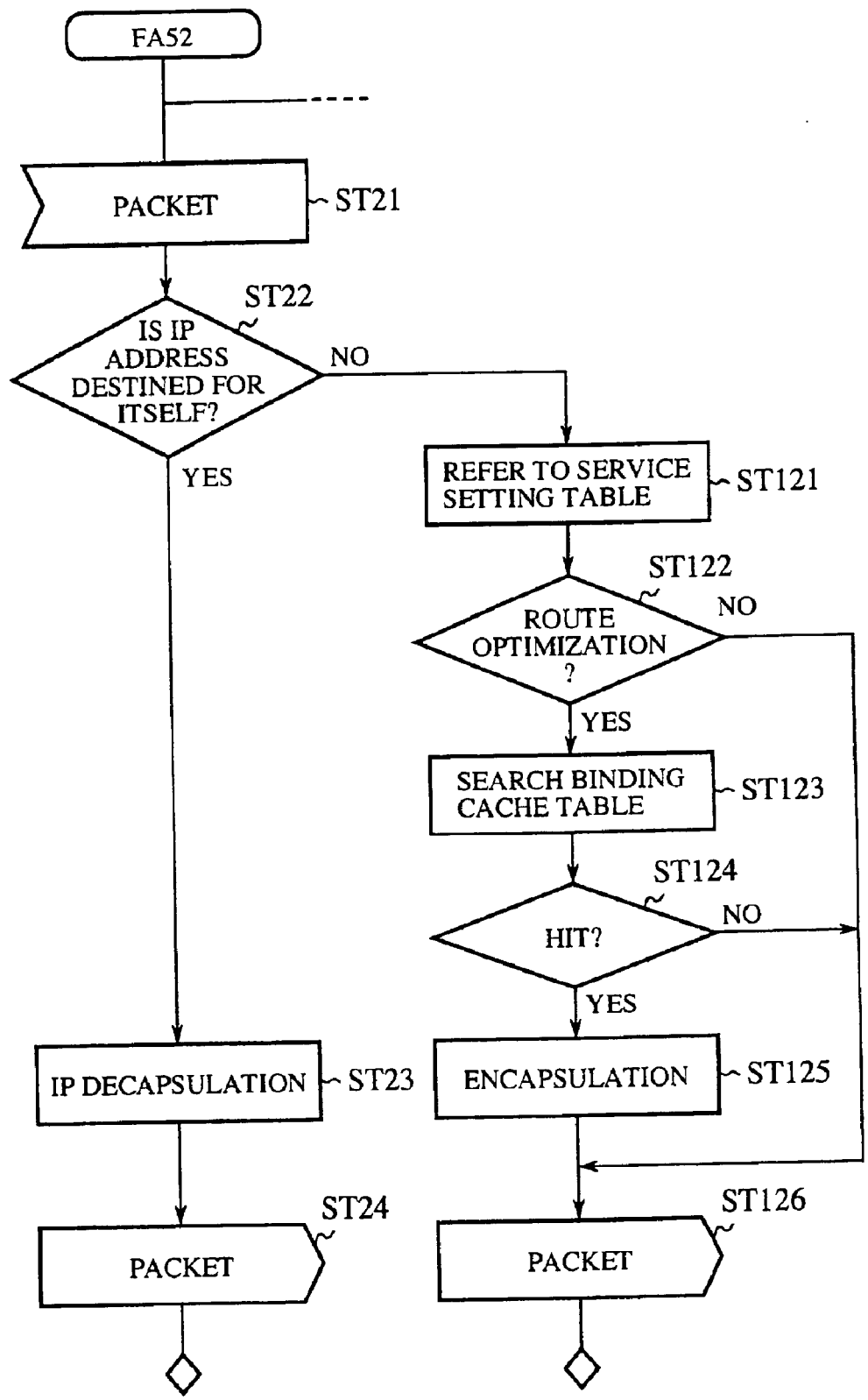
FIG. 19 is an SDL diagram showing an operation of a foreign agent according to an eighth embodiment receiving an IP packet.

FIG. 19 is an SDL diagram showing the operation of the foreign agent (32, 52, 62) according to the eighth embodiment.

Referring to the network shown in FIG. 10, the when the foreign agent (32, 52, 62) according to the eighth embodiment receives an OP packet in step ST21 via the Internet 2 or a correspondent terminal in the home IP network (3, 5, 6), the foreign agent (32, 52, 62) examines the IP packet so as to determine whether the IP packet is destined for an address in the home IP network (3, 5, 6). When it is determined that the IP packet is destined for an IP address in the home IP network (3, 5, 6), the foreign agent (32, 52, 62) decapsulates the IP packet in step ST23. In step ST24, the foreign agent (32, 52, 62) delivers the IP packet to a destination terminal in the home IP network (3, 5, 6).

When it is determined that the received IP packet is not destined for an IP address in the home IP network (3, 5, 6), the foreign agent (32, 52, 62) refers to the service setting table in step ST121 so as to determine in step ST122 whether the packet is to be processed with Route Optimization.

When it is determined as a result of referring to the service setting table that the packet is to be processed with Route Optimization, the foreign agent (32, 52, 62) determines in step ST123 whether the mobile terminal to which the IP packet is addressed is registered in the binding cache table. When it is determined that the mobile terminal to which the IP packet is addressed is registered in the binding cache table, the foreign agent (32, 52, 62) encapsulates the IP packet in step ST125 and forwards the encapsulated IP packet to the care-of address of the mobile terminal in step ST126.

When it is determined that the packet is not to be processed with Route Optimization as a result of referring to the service setting table, or when it is determined that the destination mobile terminal is not registered in the binding cache table, the foreign agent (32, 52, 62) forwards the IP packet transparently in step ST126.

The other aspects of the eighth embodiment are the same as the corresponding aspects according to the first embodiment so that the description thereof is omitted.

As described, according to the eighth embodiment, the foreign agent (32, 52, 62) is configured to encapsulate only those IP packets from selected correspondent terminals. A network manager is thus capable of individually specifying whether to execute Route Optimization. Data tolerant of delay, i.e. data not requiring real-time processing, may be processed without Route Optimization while data not tolerant of delay (such as VoIP data) are processed with Route Optimization, thus reducing the load imposed on the foreign agent (32, 52, 62).

Ninth Embodiment

The foreign agent (32, 52, 62) according to a ninth embodiment introduces a subnet mask in the service setting table. The need for Route Optimization is inclusively specified for a group of correspondent terminals 41-$i$ belonging to a subnet.

Figures 20, 21:
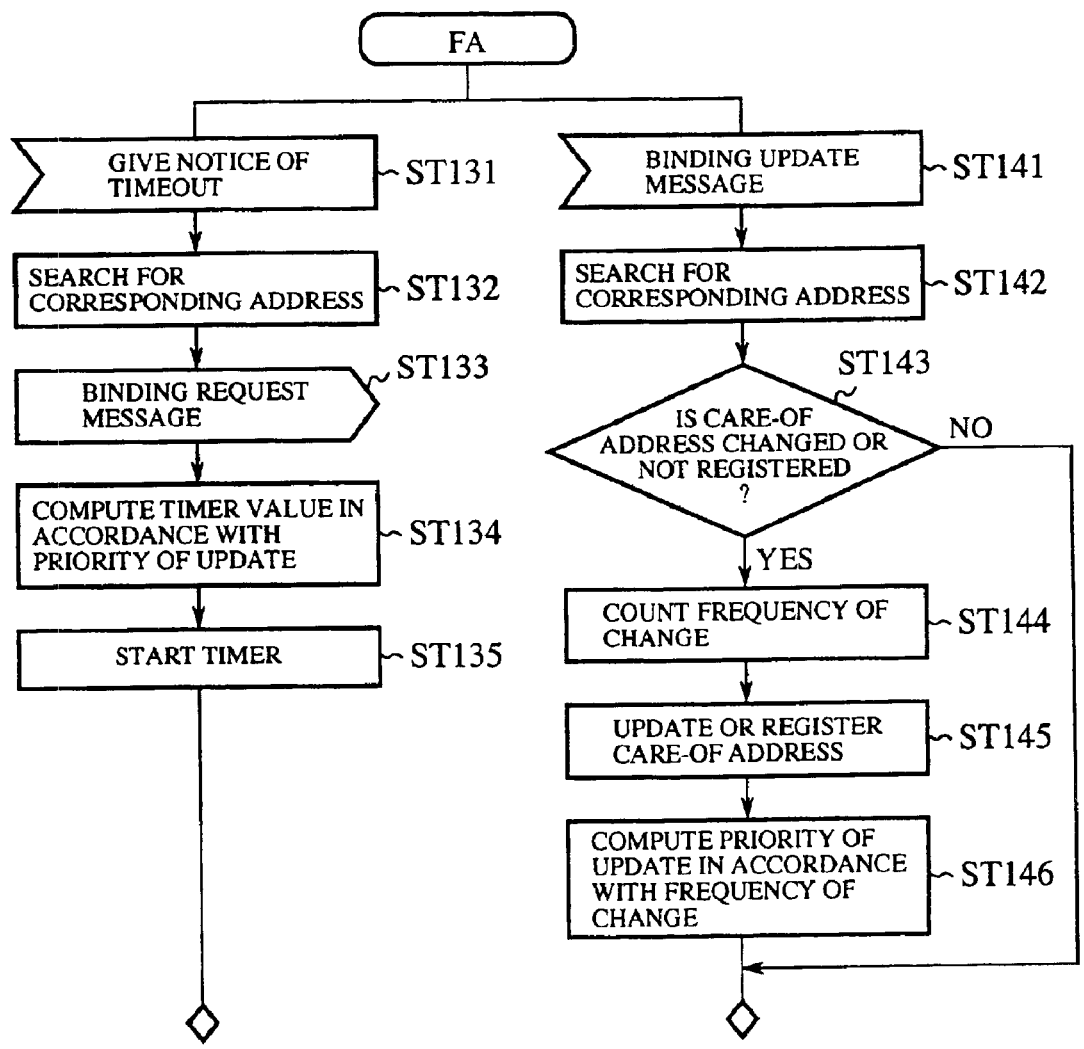
FIG. 20 shows an example service setting table in which a subnet mask is introduced.
FIG. 21 is an SDL diagram showing an operation for adjusting an interval of transmission of a Binding Request Message from the foreign agent.

FIG. 20 shows an example of a service setting table in which a subnet mask is introduced. The service setting table shown in FIG. 20 establishes that only those IP packets from the correspondent terminals belonging to the subnet 10.76.55.0 are processed with Route Optimization with the exception of the correspondent terminal having the IP address 10.75.55.101.

The other aspects of the operation are the same as the corresponding aspects according to the eighth embodiment so that the description thereof is omitted.

As described, according to the ninth embodiment, a subnet mask is used to inclusively specify the need for Route Optimization for a group of correspondent terminals belonging to the subnet. An advantage arising from this arrangement is that the service setting table is generated efficiently.

Tenth Embodiment

The foreign agent (32, 52, 62) according to a tenth embodiment adjusts the interval of transmission of a Binding Request Message in accordance with the frequency of change of the care-of address of the mobile terminal.

A description will now be given of the operation according to the tenth embodiment.

FIG. 21 is an SDL diagram showing the operation of the foreign agent (32, 52, 62) adjusting the interval of transmission of a Binding Request Message. FIG. 22 shows a binding cache table provided in the foreign agent (32, 52, 62) according to the tenth embodiment.

When the foreign agent (32, 52, 62) receives a Binding Update Message in step ST141, the foreign agent (32, 52, 62) searches the binding cache table in step ST142 for the mobile terminal corresponding to the Binding Update Message.

In step ST143, the foreign agent (32, 52, 62) determines whether the mobile terminal 11 is registered in the binding cache table and whether the care-of address included in the Binding Update Message is the same as the care-of address in the binding cache table. When it is determined that the mobile terminal 11 is not registered in the binding cache table or when it is determined that the care-of address included in the Binding Update Message is not the same as the care-of address in the binding cache table, the foreign agent counts the frequency of change of the care-of address in step ST144. In step ST145, the care-of address in the binding cache is updated so as to substitute therefor the care-of address included in the Binding Update Message. in step ST145. When the mobile terminal is not registered in the binding cache table, the frequency of change of the care-of address is set to 0 and the mobile terminal is registered in the binding cache table.

As shown in FIG. 22, the frequency of change of the care-of address and the priority of update are registered against each of the mobile terminal.

In step ST146, the foreign agent (32, 52, 62) computes the priority of update in accordance with the frequency of change of the care-of address.

When it is determined that the mobile terminal is registered in the binding cache table and that the care-of address included in the Binding Update Message is the same as the care-of address in the binding cache table, the process is terminated since there is no need to change the care-of address.

In step ST131, when an internal timer of the foreign agent (32, 52, 62) gives a notice of timeout indicating that it is time to transmit a Binding Request Message, the foreign agent (32, 52, 62) searches the binding cache table for the care-of address corresponding to the timer in step ST132. In step ST133, the foreign agent (32, 52, 62) transmits a Binding Request Message. In step ST134, the foreign agent (32, 52, 62) resets the frequency of change of the care-of address to 0 and computes a timer value in accordance with the priority of update. In step ST135, the foreign agent (32, 52, 62) starts the timer in order to remind itself of the occasion to transmit the next Binding Request Message.

The other aspects of the operation according to the tenth embodiment are the same as the corresponding aspects according to the first embodiment so that the description thereof is omitted.

As described, according to the tenth embodiment, the foreign agent (32, 52, 62) adjusts the interval of transmission of a Binding Request Message in accordance with the frequency of change of the care-of address. Accordingly, exchange of Binding Request Messages and Binding Update Messages between the foreign agent (32, 52, 62) and the home agent 13 is made to occur at an appropriate frequency. Thereby, the volume of unnecessary messages exchanged is reduced, so that the volume of traffic on the network is reduced.

Eleventh Embodiment

The foreign agent (32, 52, 62) according to an eleventh embodiment sets an initial value of the priority of update for each mobile terminal 11-$i$.

FIG. 23 shows an example of a service setting table provided in the foreign agent (32, 52, 62) according to the eleventh embodiment. In the service setting table shown in FIG. 23, the initial value of priority of update for the mobile terminal 11-1 is set to 5, and the initial value of priority of update for the mobile terminal 11-2 is set to 3. The network manager is responsible for setting the initial values.

A description will now be given of the operation according to the eleventh embodiment.

The foreign agent (32, 52, 62) of the IP network (3, 5, 6) to which the correspondent terminal currently belongs reads the initial value of priority of update for the mobile terminal 11-$i$ and computes' a timer value in accordance with the initial value of priority of update. The foreign agent (32, 52, 62) then starts a timer for timing the transmission of next Binding Request Message to the mobile terminal 11-$i$.

The other aspects of the operation according to the eleventh embodiment are the same as the corresponding aspects according to the tenth embodiment so that the description thereof is omitted.

When the initial values of priority of update are set as shown in FIG. 23, the Binding Request Message for the mobile terminal 11-1 having the IP address 10.76.51.100 is transmitted more frequently than the Binding Request Message for the mobile terminal 11-2 having the IP address 10.76.51.101, given that the lifetime of the Binding Update Message is unchanged.

As described, according to the eleventh embodiment, the foreign agent (32, 52, 62) sets the initial value of priority of update for each mobile terminal 11-$i$. With this, it is ensured that the varying quality of Route Optimization service is provided for a plurality of mobile terminals 11-$i$.

Twelfth Embodiment

The foreign agent (32, 52, 62) according to a twelfth embodiment registers a plurality of care-of addresses for a mobile terminal in a binding cache table so that IP packets destined for the home address of the mobile terminal are tunneled to each of the plurality of care-of addresses.

When the mobile terminal is located at a boundary between a plurality of IP networks, handover may take place frequently. In this situation, the mobile terminal frequently notifies the home agent 13 of a change in the care-of address, increasing the network load and power consumption of the mobile terminal. The Mobile IP protocol allows the mobile terminal at a boundary between a plurality of IP networks to register a plurality of care-of addresses in order to eliminate the necessity for the mobile terminal to frequently change the care-of address. In triangular routing, the home agent 13 in which the plurality of care-of addresses are registered forwards the IP packets destined for the mobile terminal to each of the plurality of care-of addresses.

However, since IP packets destined for the mobile terminal are not routed via the home agent according to the related-art Route Optimization, IP packets are forwarded to only one of the plurality of care-of addresses.

The foreign agent (32, 52, 62) according to the twelfth embodiment registers, in the binding cache table, the plurality of care-of addresses registered in the home agent 13 so that the routes to the care-of addresses are optimized.

A description will now be given of the operation according to the twelfth embodiment.

Figure 24:
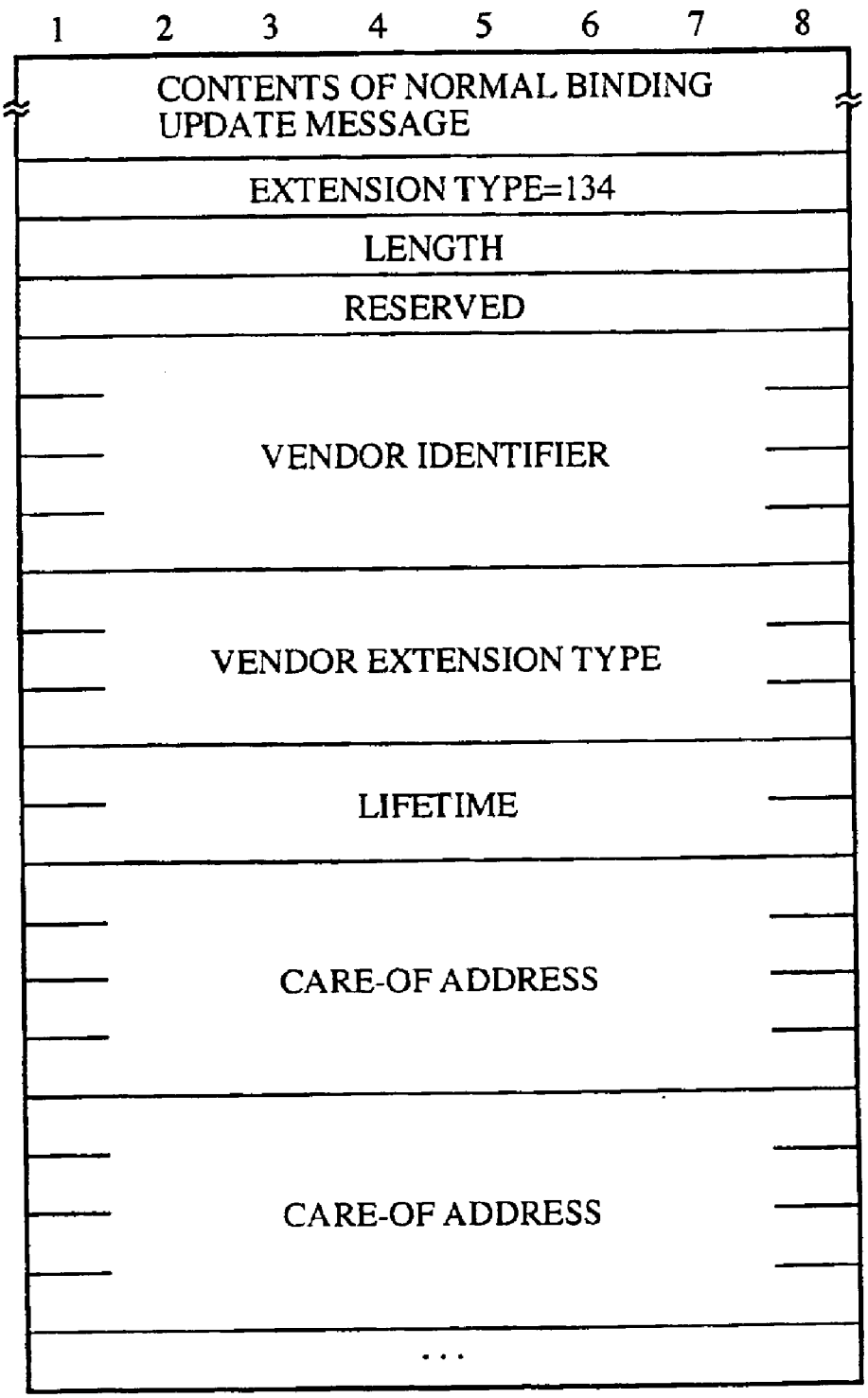
FIG. 24 shows an example of an extended Binding Update Message according to a twelfth embodiment.

FIG. 24 shows an example of an extended Binding Update Message according to the twelfth embodiment.

When the home agent 13 in which a plurality of care-of addresses are registered for a given mobile terminal 11 receives a Binding Request Message for the mobile terminal 11, the home agent 13 sends an extended Binding Update Message as shown in FIG. 24 to the foreign agent (32, 52, 62) originating the Binding Request Message. The extended portion of the Binding Update Message contains second and subsequent care-of addresses.

The foreign agent (32, 52, 62) receiving the extended Binding Update Message reads a first care-of address from the unextended portion and reads additional care-of addresses from the extended portion. The foreign agent (32, 52, 62) then registers the care-of addresses thus read in the binding cache table in relation to the target mobile terminal 11.

The foreign agent (32, 52, 62) receiving an IP packet destined for the home address of the mobile terminal 11 tunnels the IP packet to each of the plurality of care-of addresses corresponding to the home address.

The other aspects of the twelfth embodiment are the same as the corresponding aspects of the first embodiment so that the description thereof is omitted.

As described, according to the twelfth embodiment, the foreign agent (32, 52, 62) registers a plurality of care-of addresses for the mobile terminal 11 in the binding cache table, as the situation demands. IP packets destined for the home address of the mobile terminal 11 are tunneled to each of the plurality of care-of addresses. Accordingly, even when the care-of address of the mobile terminal 11 located at a boundary between network domains changes frequently, it is ensured that IP packets are properly delivered to the mobile terminal without going through a process of address registration every time the care-of address is changed.

Thirteenth Embodiment

When a correspondent terminal visits an IP network (3, 5, 6), the foreign agent (32, 52, 62) according to a thirteenth embodiment acquires information registered in a binding cache table provided in the remote foreign agent (32, 52, 62) belonging to the remote IP network (3, 5, 6) from which the visiting correspondent terminal arrived. The information thus acquired is registered in the binding cache table of the acquiring foreign agent (32, 52, 62).

In the related-art Route Optimization, when a correspondent terminal originating an IP packet moves across IP networks, IP packets form the correspondent terminal to a target mobile terminal are temporarily routed via the home agent of the target mobile terminal until the foreign agent of the visited IP network receives a Binding Update Message, since the foreign agent does not have information relating to the correspondent terminal registered in the binding cache table. Consequently, the same operation performed according to a sequence of FIG. 9 when the correspondent terminal transmits an IP packet for the first time is repeated whenever the correspondent terminal moves across IP networks. Thus, triangular routing occurs temporarily.

The foreign agent (32, 52, 62) according to the thirteenth embodiment resolves the problem of temporary triangular routing occurring when the correspondent terminal moves across IP networks, by allowing the foreign agent (32, 52, 62) of the visited IP network to acquire registered information from the binding cache table of the remote foreign agent (32, 52, 62) of the remote IP network from which the visiting correspondent terminal arrived.

A description will now be given of the operation according to the thirteenth embodiment.

Figure 25:
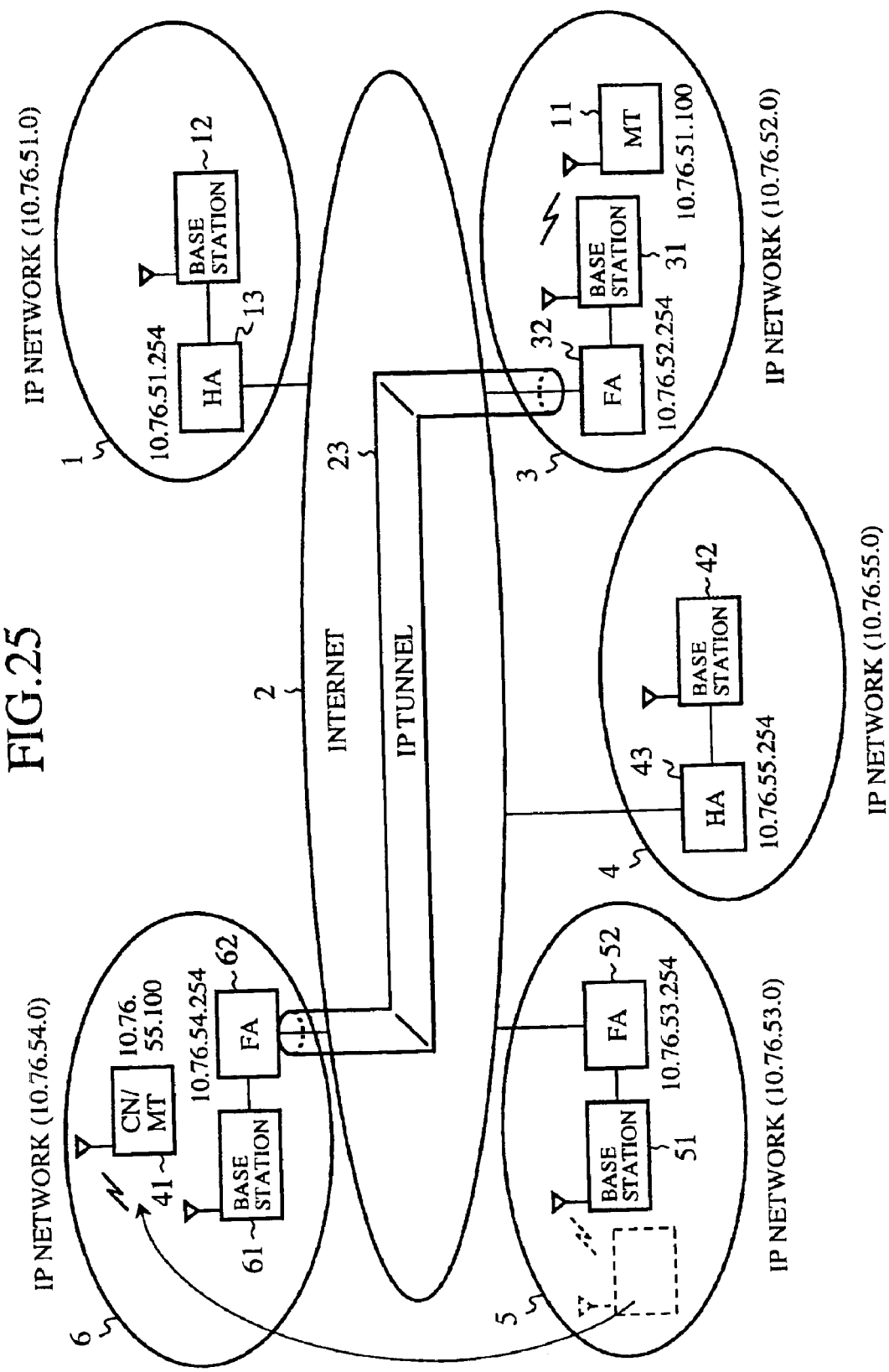
FIG. 25 shows that the correspondent terminal of the network shown in FIG. 1 moves to a remote IP network.
Figure 26:
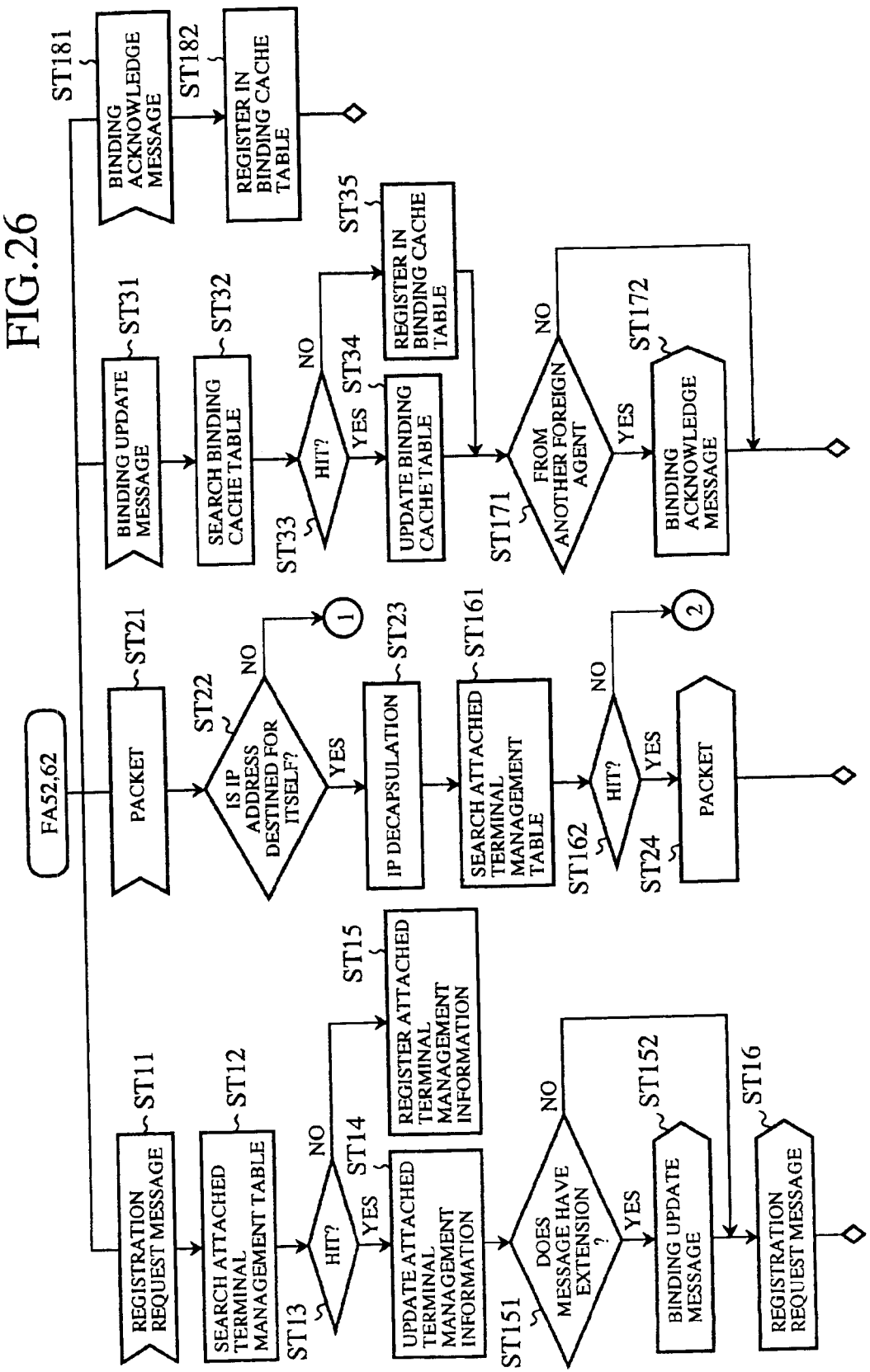
FIG. 26 is an SDL diagram showing an operation of the foreign agent according to a thirteenth embodiment.
Figure 27:
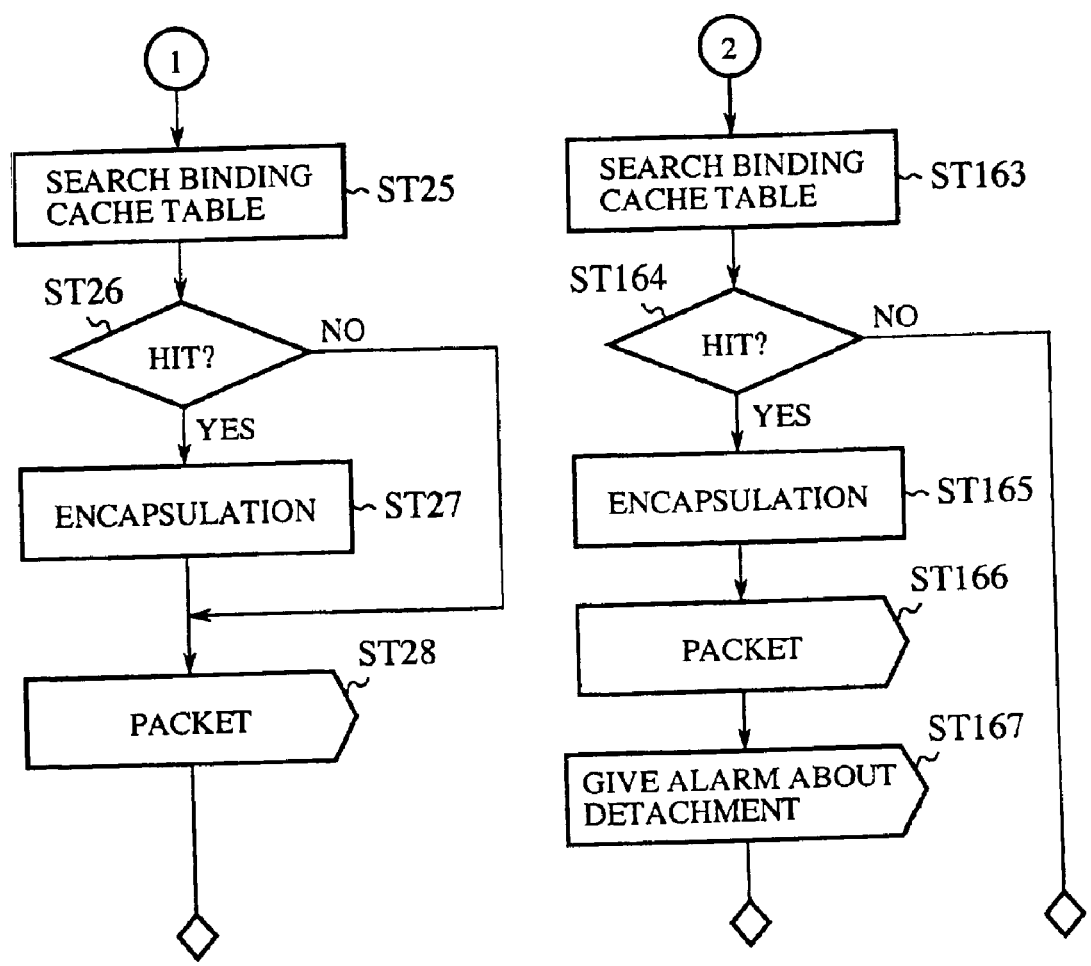
FIG. 27 is an SDL diagram showing an operation of the foreign agent according to the thirteenth embodiment.

FIG. 25 shows that the correspondent terminal 41 of the network shown in FIG. 1 moves to the remote IP network 6. FIGS. 26 and 27 are SDL diagrams showing the operation of the foreign agent (32, 52, 62) according to the thirteenth embodiment.

When the foreign agent 62 (32, 52) according to the thirteenth embodiment receives a Registration Request Message in step ST11, control is successively turned to steps ST12, ST13, ST14 and ST15. In step ST151, a determination is made as to whether the Registration Request Message contains an extended portion (described later). If it is determined that the Registration Request Message contains an extended portion, control is turned to step ST152, where the foreign agent 62 (32, 52) sends a Binding Update Message informing a foreign agent 52 (32, 62), to which the visiting correspondent terminal 41, of the care-of address of the visiting correspondent terminal 41 originating the Registration Request Message. Subsequently, in step ST16, the foreign agent (32, 52, 62) forwards the Registration Request Message to the home agent 43 for the correspondent terminal 41 originating the Registration Request Message (or the home agent 13 for the mobile terminal).

When the foreign agent (32, 52, 62) according to the thirteenth embodiment receives an IP packet in step ST21 and when it is determined in step ST22 that the IP packet is destined for an IP address in the home IP network (3, 5, 6), the foreign agent decapsulates the IP packet.

In step ST161, the foreign agent (32, 52, 62) searches the attached terminal management table for a terminal having the home address identical to the destination address of the IP packet. In step ST162, a determination is made as to whether there is such a terminal. If it is determined that there is a terminal having the home address identical to the destination address of the IP packet, it is determined that the destination terminal is located in the home IP network (3, 5, 6). In step ST24, the IP packet is delivered to that terminal.

If it is determined that the attached terminal management table does not list a terminal having the home address identical to the destination address of the IP packet, it is determined that the destination terminal is not located in the home IP network (3, 5, 6) of the foreign agent (32, 52, 62). In a subsequent step ST163, the foreign agent (32, 52, 62) then searches the binding cache table so as to determine in step ST164 whether the packet destination terminal (mobile terminal 11) is registered in the binding cache table. If it is determined that the mobile terminal 11 to which the IP packet is addressed is registered in the binding cache table, the foreign agent (32, 52, 62) decapsulates the IP packet in step ST165. In step ST166, the foreign agent (32, 52, 62) forwards the encapsulated IP packet to the current care-of address of the mobile terminal 11. In step ST167, an alarm is given indicating that the destination mobile terminal 11 is not attached to the IP network, (3, 5, 6) of the foreign agent (32, 52, 62). If it is determined that the destination mobile terminal 11 is not registered in the binding cache table, the foreign agent (32, 52, 62) discards the IP packet.

When the foreign agent (32, 52, 62) receives a Binding Update Message in step ST131, control is successively turned to steps ST33, ST34 or ST35. In a subsequent step ST171, a determination is made as to whether the Binding Update Message is from another foreign agent (32, 52, 62). If it is determined that the Binding Update Message is from another foreign agent (32, 52, 62), a Binding Acknowledge Message containing the contents of the local binding cache table is sent to the foreign agent (32, 52, 62) originating the Binding Update Message in step ST172.

When the foreign agent (32, 52, 62) receives the Binding Acknowledge Message in step ST181, the foreign agent (32, 52, 62) generates, in step ST182, a binding cache table based on the contents of the Binding Acknowledge Message or appends the contents to the existing cache table.

Figure 28:
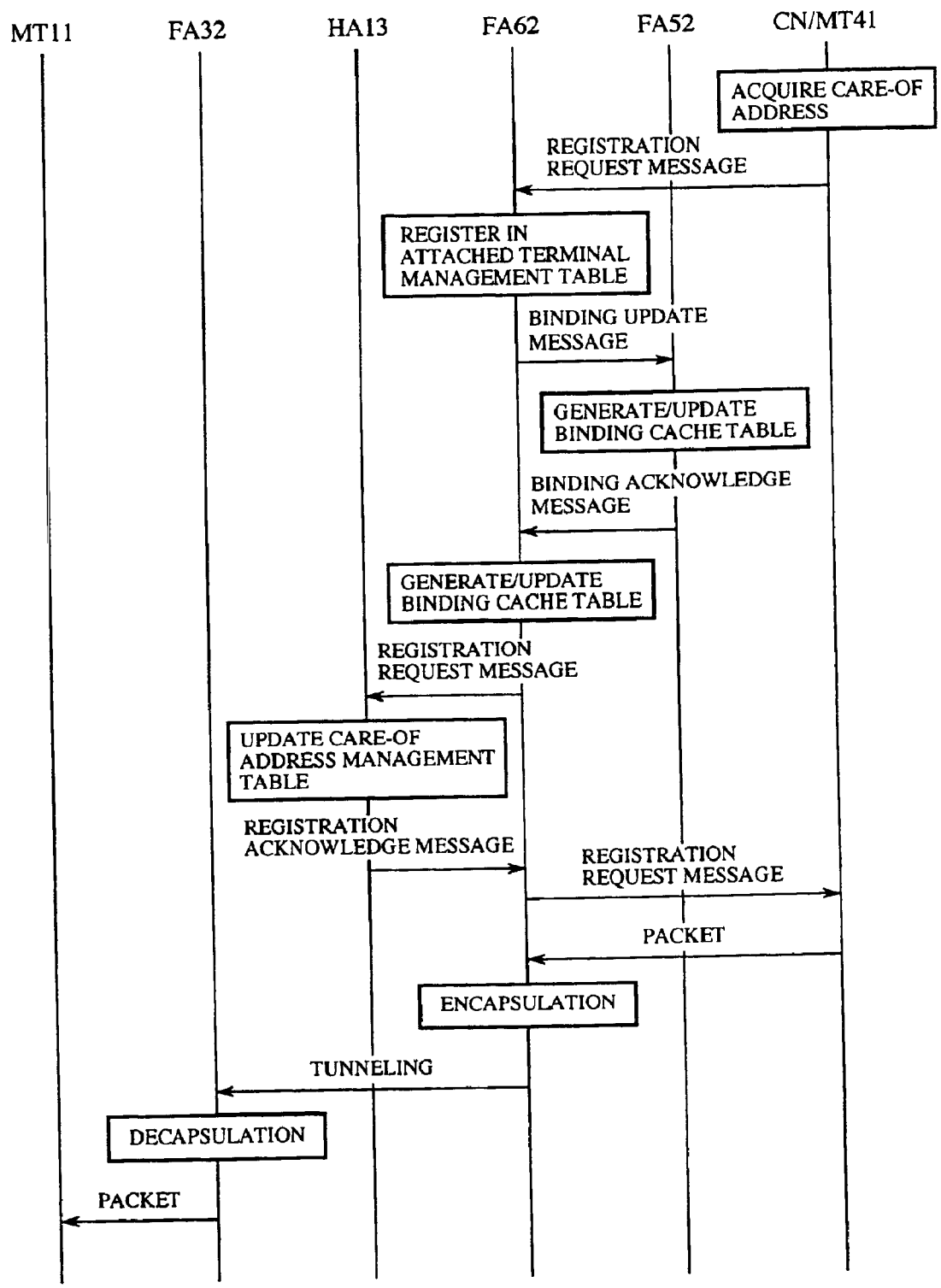
FIG. 28 shows a sequence of operations performed by terminals and agents when the correspondent terminal moves to a remote IP network.
Figure 30:
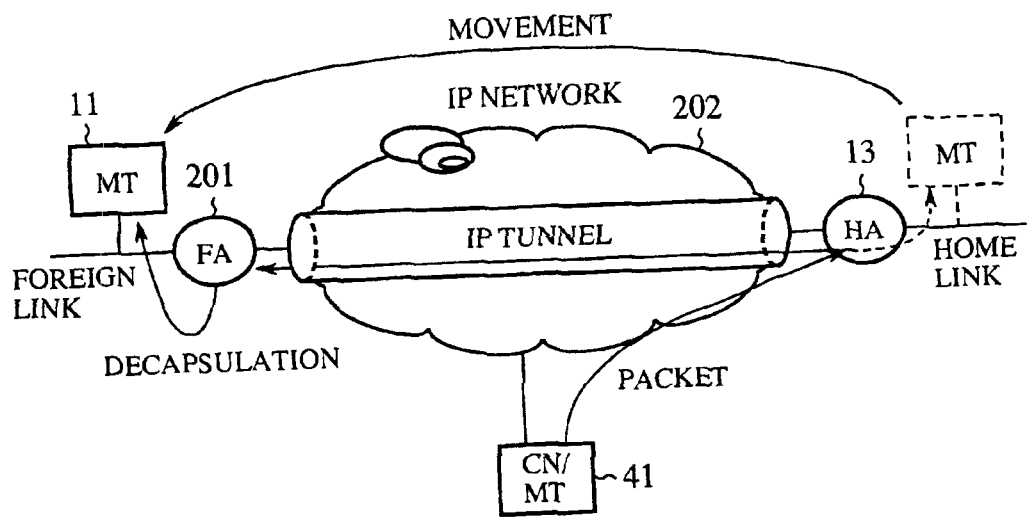
FIG. 30 shows how a packet is transmitted according to the Mobile IP protocol of the related art.
Figure 31:
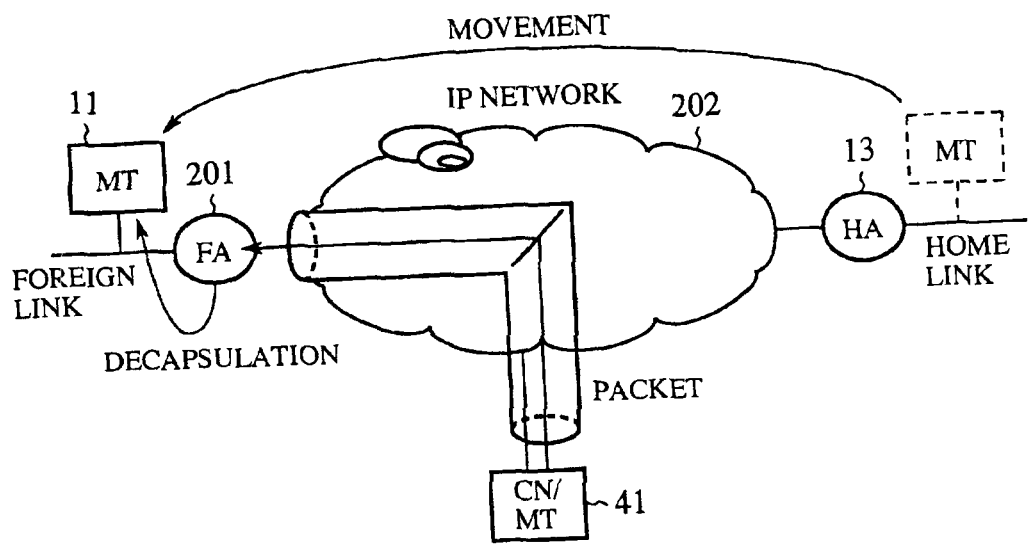
FIG. 31 shows Route Optimization applied to the related-art Mobile IP.

A description will now be given of the operation performed by terminals and agents when the correspondent terminal 41 moves from the IP network 5 to the IP network 6. FIG. 28 shows a sequence of operations performed by terminals and agents when the correspondent terminal 41 moves to a remote IP network 6. The base station (12, 31, 42, 51, 61) merely performs transparent transmission so that the description of the operation thereof is omitted.

As shown in FIG. 25, upon moving from the IP network 5 to the IP network 6, the correspondent terminal 41 acquires a care-of address via, for example, an agent advertisement from the foreign agent 62.

The correspondent terminal 41 acquiring the care-of address notifies the home gent 43 of the care-of address thus acquired and sends a Registration Request Message to the foreign agent 62 of the IP network 6 to which the correspondent terminal 41 currently belongs.

The Registration Request Message is an extended version including an instruction for causing the foreign agent 62 to notify the foreign agent 52 of the care-of address of the correspondent terminal. This extension is in accordance with the IETF Internet draft (draft-ietf.mobileip-optim-08.txt). The extended Registration Request Message includes the old care-of address and the new care-of address of the correspondent terminal 41.

When receiving the Registration Request Message 6, the foreign agent 62 generates a Binding Update Message for notifying the foreign agent 52 of the care-of address of the correspondent terminal 41 and sends the generated message to the foreign agent 52.

The foreign agent 52 receiving the Binding Update Message generates a binding cache table in which the old care-of address of the correspondent terminal 41 is mapped into the new care-of address. The foreign agent 52 also sends a Binding Acknowledge Message to the foreign agent 62. Thereafter, when the foreign agent 52 receives an IP packet destined for the old care-of address of the correspondent terminal 41, the foreign agent 52 tunnels the IP packet to the new care-of address.

The Binding Acknowledge Message transmitted from the foreign agent 52 is an extended version formed to ensure that the information registered in the binding cache table provided in the foreign agent 52 is delivered to the foreign agent 62. FIG. 29 shows an example of an extended Binding Acknowledge Message according to the thirteenth embodiment. As shown in FIG. 29, the extended portion of the Binding Acknowledge Message includes the home address of the mobile terminal 11 registered in the binding cache table, the care-of address of the mobile terminal 11 and the address of the home agent of the mobile terminal 11.

The foreign agent 62 receiving the extended Binding Acknowledge generates a binding cache table for the mobile terminal 11 based on the contents of the extended portion of the Binding Acknowledge Message. The foreign agent 62 sends the Binding Request Message to the home agent 13 in order to inform the home agent 13 of the new care-of address of the correspondent terminal 41. Thereby, an IP tunnel 23 extending from the foreign agent 62 to the foreign agent 32 is formed.

The other aspects of the operation according to the thirteenth embodiment are the same as the corresponding aspects according to the first embodiment so that the description thereof is omitted.

As described, according to the thirteenth embodiment, when the correspondent terminal 41 moves across IP networks, the foreign agent (32, 52, 62) of the destination IP network (3, 5, 6) acquires the information registered in the binding cache table provided in the foreign agent (32, 52, 62) of the source IP network (3, 5, 6) so as to register the acquired information in the local binding cache table. With this, a temporary triangular routing is prevented from occurring so that Route Optimization is properly maintained.

Fourteenth Embodiment

The foreign agent (32, 52, 62) according to the fourteenth embodiment monitors the volume of IP packets exchanged between the correspondent terminal 41 belonging to the home IP network (3, 5, 6) and the mobile terminal 11. Depending on the volume monitored, the foreign agent (32, 52, 62) refrains from updating the care-of address registered in the binding cache table.

In accordance with the first through thirteenth embodiments described above, the foreign agent (32, 52, 62) periodically updates the care-of address of the mobile terminal 11 once it is registered in the binding cache table. An update occurs even when the correspondent terminal 41 has not transmitted any IP packets. As a result, the care-of address of the mobile terminal 11 less frequently receiving an IP packet is also periodically updated.

The foreign agent (32, 52, 62) according to the fourth embodiment refrains from updating the care-of address of the mobile terminal 11 less likely to receive an IP packet.

A description will now be given of the operation according to the fourteenth embodiment.

The foreign agent (32, 52, 62) of the IP network (3, 5, 6) to which the correspondent terminal 41 currently belongs reads a destination IP address and an origination IP address specified in a received packet so as to compute a volume of traffic between the mobile terminal 11 and the correspondent terminal 41.

When the traffic of IP packets between the mobile terminal 11 and the correspondent terminal 41 is absent for a predetermined period of time, the foreign agent (32, 52, 62) suspends the transmission of a Binding Request Message and update of care-of address in the binding cache table.

The other aspects of the operation according to the fourteenth embodiment are the same as the corresponding aspects according to the first embodiment so that the description thereof is omitted.

As described, according to the fourteenth embodiment, the foreign agent (32, 52, 62) monitors the volume of traffic of IP packets from the mobile terminal 11 and IP packets destined for the mobile terminal 11. The foreign agent (32, 52, 62) refrains from updating the care-of address of the mobile terminal 11 in the binding cache table depending on the monitored volume. Accordingly, the volume of packets for exchanging messages between the foreign agent (32, 52, 62) and the home agent 13 is reduced.

Fifteenth Embodiment

The foreign agent (32, 52, 62) according to the fifteen embodiment suspends the update of care-of address registered in the binding cache table when the correspondent terminal 41 moves out of the local IP network (3, 5, 6).

A description will now be given of the operation according to the fifteenth embodiment.

Referring to the network of FIG. 25, when the correspondent terminal 41 moved from the IP network 5 accommodating the foreign agent 52 to the IP network 6 accommodating the foreign agent 62, a Binding Update Message is transmitted from the foreign agent 62 to the foreign agent 52, as shown in FIG. 28.

With this, the foreign agent 52 is informed that the correspondent terminal 41 has left the IP network 5. Even when the Binding Update Message is not sent to the foreign agent 52, the foreign agent 52 determines that the correspondent terminal 41 left the IP home network 5 when the care-of address for the correspondent terminal 41 is no longer valid.

After the correspondent terminal 41 left the local IP network 5, it is not necessary for the foreign agent 52 to tunnel an IP packet from the correspondent terminal 41 to the care-of address of the mobile terminal 11. Therefore, the foreign agent 52 suspends the update of care-of address in the binding cache table when it is determined that the correspondent terminal 41 left the local IP network 5.

As described, according to the fifteenth embodiment, when the correspondent terminal moves across IP networks, the foreign agent (32, 52, 62) of the source IP network (3, 5, 6) does not update the care-of address registered in the binding cache table. Accordingly, the volume of packets for exchanging messages between the foreign agent (32, 52, 62) and the home agent 13 is reduced.

Sixteenth Embodiment

The foreign agent (32, 52, 62) according to the sixteenth embodiment resumes the update of care-of address when a certain condition is met.

A description will now be given of the operation according to the sixteenth embodiment.

The foreign agent (32, 52, 62) resumes the update of care-of address when it receives a Binding Update Message for the care-of address for which the update was suspended in accordance with the fourteenth and fifteenth embodiments. Alternatively, the update of care-of address may be resumed when tunneling transmission to the care-of address occurs.

Thus, according to the sixteenth embodiment, the update of care-of address is resumed when a certain condition is met. Accordingly, the update of care-of address is performed at an appropriate frequency adapted for the purpose. With this, the volume of packets for exchanging messages between the foreign agent (32, 52, 62) and the home agent 13 is reduced.

In the description given above, the function of the foreign agent (32, 52, 62) and the function of the home agent (13, 43) are assumed to be separate from each other. Alternatively, the home agent (13, 43) may be provided with the function of a foreign agent for terminals not belonging to the home agent (13, 43).

The present invention is not limited to the above-described embodiments, and variations and modifications may be made without departing from the scope of the present invention.

What is claimed is:

1. A route optimization method for a communication system that allows communication between a mobile terminal and a correspondent terminal, for optimizing a route for communication between the correspondent terminal and the mobile terminal when the mobile terminal moves across network domains, comprising the steps of:

causing a foreign agent or a home agent of a network domain to which the correspondent terminal currently belongs to receive a Binding Update Message from a home agent for the mobile terminal and to forward a packet destined for the mobile terminal to a care-of address of the mobile terminal specified in the Binding Update Message.

2. The route optimization method according to claim 1, further comprising the steps of:

causing the foreign agent or the home agent of the network domain to which the correspondent terminal currently belongs to repeat transmission of a Binding Request Message to the home agent for the mobile terminal in order to acquire the latest care-of address; and causing the home agent for the mobile terminal to transmit, in response to the Binding Request Message, a Binding Acknowledge Message containing the latest care-of address of the mobile terminal to the foreign agent or the home agent of the network domain to which the correspondent terminal currently belongs.

3. The route optimization method according to claim 2, wherein the foreign agent or the home agent of the network domain to which the correspondent terminal currently belongs accepts only the Binding Update Message from the selected home agents.

4. The route optimization method according to claim 3, wherein the foreign agent or the home agent of the network domain to which the corresponding terminal belongs uses a subnet mask to maintain a list of home agents from which Binding Update Message is acceptable.

5. The route optimization method according to claim 2, wherein the foreign agent or the home agent of the network domain to which the correspondent terminal currently belongs controls an interval of transmission of the Binding Request Message in accordance with a frequency of change of the core-of address.

6. The route optimization method according to claim 5, wherein the foreign agent or the home agent of the network domain to which the correspondent terminal currently belongs sets an initial value of priority of update for each mobile terminal, computes the priority of update in care-of address, and sets the interval of transmission of the Binding Request Message in accordance with the priority of update.

7. The route optimization method according to claim 2, wherein the foreign agent or 5 the home agent of the network domain to which the correspondent terminal currently belongs monitors a volume of packets destined for the mobile terminal or packets from the mobile terminal so as to control update of the care-of address of the mobile terminal in accordance with the monitored volume.

8. The route optimization method according to claim 2, wherein the foreign agent or the home agent suspends update of the care-of address when the correspondent terminal moves out of the network domain.

9. The route optimization method according to claim 8, wherein the foreign agent or the home agent resumes the suspended update of the care-of address when a predetermined condition is met.

10. The route optimization method according to claim 1, further comprising the steps of causing the foreign agent or the home agent of the network domain to which the correspondent terminal belongs to combine a plurality of Binding Request Messages for obtaining the care-of addresses of, a plurality of mobile terminals into an extended Binding Request Message and to send the extended Binding Request Message, when the plurality of mobile terminals are coupled to the same home agent.

11. The route optimization method according to claim 10, wherein the foreign agent or the borne agent of the network domain to which the correspondent terminal currently belongs uses subnet masking to maintain a list of home agents capable of interpreting an extended Binding Request Message, so as to send the extended Binding Request Message for the plurality of mobile terminals to the home agent capable of interpretation and send the Binding Request Message for each mobile terminal to the other home agents.

12. The route optimization method according to claim 10, the home agent for the mobile terminal notifies the foreign agent or the home agent of the network domain to which the correspondent terminal currently belongs whether the home agent is capable of interpreting the extended Binding Request Message, and the foreign agent or the home agent of the network domain to which the correspondent terminal currently belongs dynamically determines whether the home agent for the mobile terminal is capable of interpreting the extended Binding Request Message, based on the notification, so that the foreign agent or the home agent sends the extended Binding Request Message for the plurality of mobile terminals to the home agent capable of interpreting the extended Binding Request Message and sends the Binding Request Message for each mobile terminal to the home agent.

13. The route optimization method according to claim 1, wherein the foreign agent or the home agent forwards only the packet from the correspondent terminal to the mobile terminal.

14. The route optimization method according to claim 13, wherein the foreign agent or the home agent uses a subnet mask to designate a group of correspondent terminals with respect to route optimization.

15. The route optimization method according to claim 1, wherein the foreign agent or the home agent of the network domain to which the correspondent terminal currently belongs maintains a plurality of care-of addresses for the mobile terminal and forwards the packet destined to a home address of the mobile terminal to each of the plurality of care-of addresses.

16. The route optimization method according to claim 1, wherein the foreign agent or the home agent of the network domain visited by the correspondent terminal acquires the care-of address of the mobile terminal from the foreign agent or the home agent of the network domain from which the visiting correspondent terminal arrives.

17. An agent apparatus for a communication system in which a mobile terminal communicates with a correspondent terminal, operated as a foreign agent or a home agent for a network domain to which the correspondent terminal belongs, comprising:

- a receiver for receiving a Binding Update Message from a home agent for the mobile terminal; and

- a transmitter for forwarding a packet destined for the mobile terminal to a current care-of address of the mobile terminal designated in the Binding Update Message.

* * * * *